(12) United States Patent
Lesesky et al.

(10) Patent No.: US 9,604,508 B2
(45) Date of Patent: Mar. 28, 2017

(54) METHOD FOR COMMUNICATING DATA BETWEEN AN NFC-ENABLED DEVICE ON A VEHICLE AND A DRIVER INDENTIFICATION DEVICE

(71) Applicant: ITIRE, LLC, Rock Hill, SC (US)

(72) Inventors: Alan C. Lesesky, Charlotte, NC (US); Samuel Duke Drinkard, Gaston, SC (US)

(73) Assignee: iTIRE, LLC, Rock Hill, SC (US)

( * ) Notice: Subject to any disclaimer, the term of this patent is extended or adjusted under 35 U.S.C. 154(b) by 0 days.

(21) Appl. No.: 14/963,572

(22) Filed: Dec. 9, 2015

(65) Prior Publication Data

US 2016/0343178 A1    Nov. 24, 2016

Related U.S. Application Data

(63) Continuation of application No. 14/719,827, filed on May 22, 2015, which is a continuation-in-part of application No. 14/646,848, filed as application No. PCT/US2015/019675 on Mar. 10, 2015.

(51) Int. Cl.
| | |
|---|---|
| G06K 19/02 | (2006.01) |
| B60C 19/00 | (2006.01) |
| G06K 19/077 | (2006.01) |
| B60C 23/04 | (2006.01) |
| B60C 23/20 | (2006.01) |
| B60C 23/00 | (2006.01) |
| G07C 5/00 | (2006.01) |
| H04B 5/00 | (2006.01) |
| H04W 76/02 | (2009.01) |

(52) U.S. Cl.
CPC .............. *B60C 19/00* (2013.01); *B60C 23/00* (2013.01); *B60C 23/0447* (2013.01); *B60C 23/20* (2013.01); *G06K 19/07722* (2013.01); *G06K 19/07758* (2013.01); *G06K 19/07764* (2013.01); *G07C 5/008* (2013.01); *H04B 5/0056* (2013.01); *H04W 76/023* (2013.01); *B60C 2019/004* (2013.04)

(58) Field of Classification Search
CPC ....................... G06K 17/0022; G06K 17/0029
USPC ...... 235/380, 382, 384, 385, 462.46, 472.02
See application file for complete search history.

(56) References Cited

U.S. PATENT DOCUMENTS

| | | |
|---|---|---|
| 6,262,692 B1 | 7/2001 | Babb |
| 2003/0040873 A1 | 2/2003 | Lesesky et al. |
| 2004/0046663 A1 | 3/2004 | Jesser |
| 2004/0095244 A1 | 5/2004 | Conwell et al. |
| 2004/0144847 A1 | 7/2004 | Yamanaka et al. |
| 2005/0101060 A1 | 5/2005 | Tsunoda et al. |
| 2006/0109123 A1 | 5/2006 | Carrender |
| 2009/0033582 A1 | 2/2009 | Blenkhorn et al. |

(Continued)

OTHER PUBLICATIONS

U.S. Appl. No. 14/719,827, filed May 22, 2015.

*Primary Examiner* — Daniel St Cyr
(74) *Attorney, Agent, or Firm* — Schwartz Law Firm, P.C.

(57) ABSTRACT

A method for communicating data between a vehicle and a mobile computing device includes locating at least one NFC-enabled device on the vehicle. Vehicle user data is wirelessly transferred between the NFC-enabled device and the mobile computing device. Using the vehicle user data, the NFC-enabled device on the vehicle and the mobile computing device are paired.

10 Claims, 32 Drawing Sheets

(56) References Cited

U.S. PATENT DOCUMENTS

| | | | | |
|---|---|---|---|---|
| 2011/0007901 A1* | 1/2011 | Ikeda | ............... | H04B 5/02 |
| | | | | 380/270 |
| 2011/0248830 A1 | 10/2011 | Jeppesen | | |
| 2012/0037706 A1 | 2/2012 | Hourani | | |
| 2014/0355656 A1* | 12/2014 | Liou | ............... | G06F 3/041 |
| | | | | 375/219 |
| 2015/0332031 A1* | 11/2015 | Mistry | ............ | G06F 21/316 |
| | | | | 726/19 |

* cited by examiner

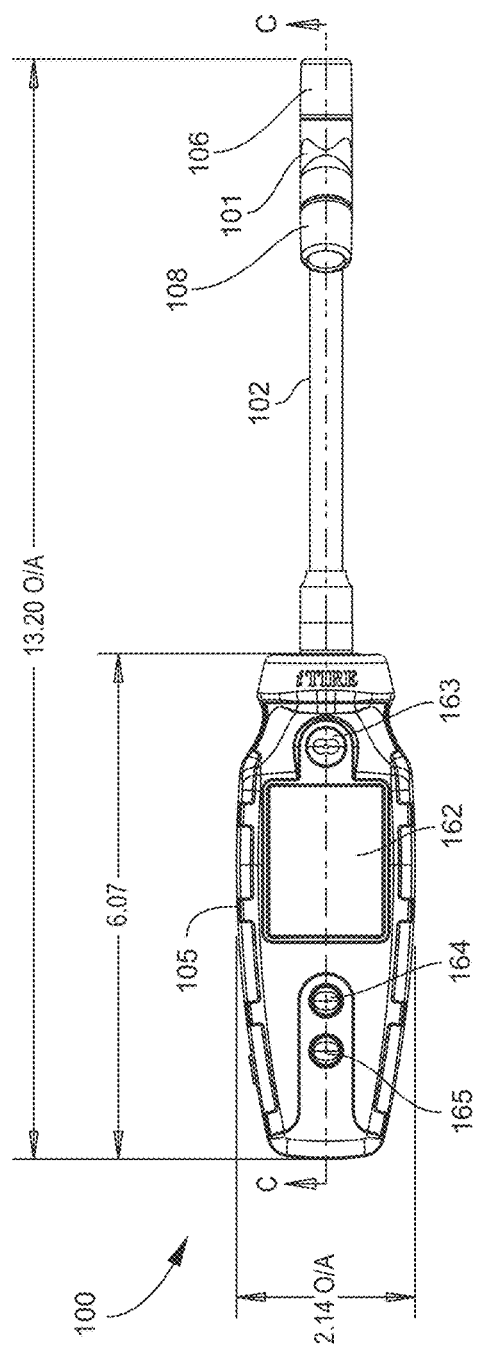
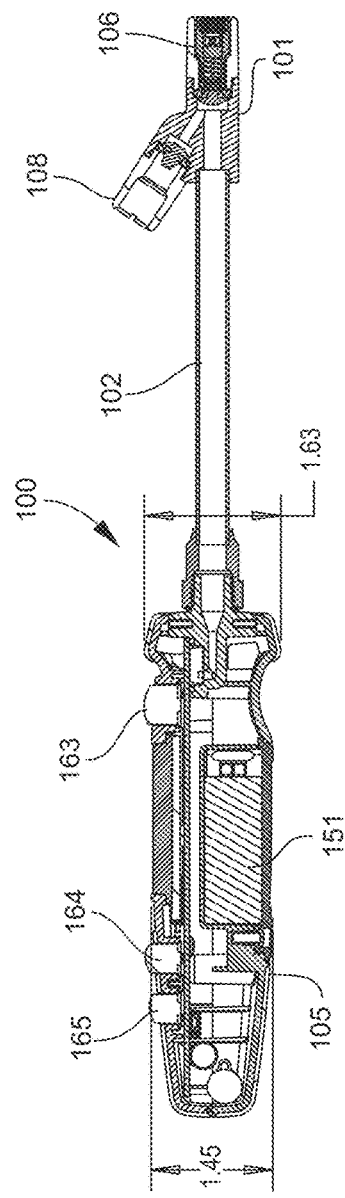
Fig. 17
Fig. 18

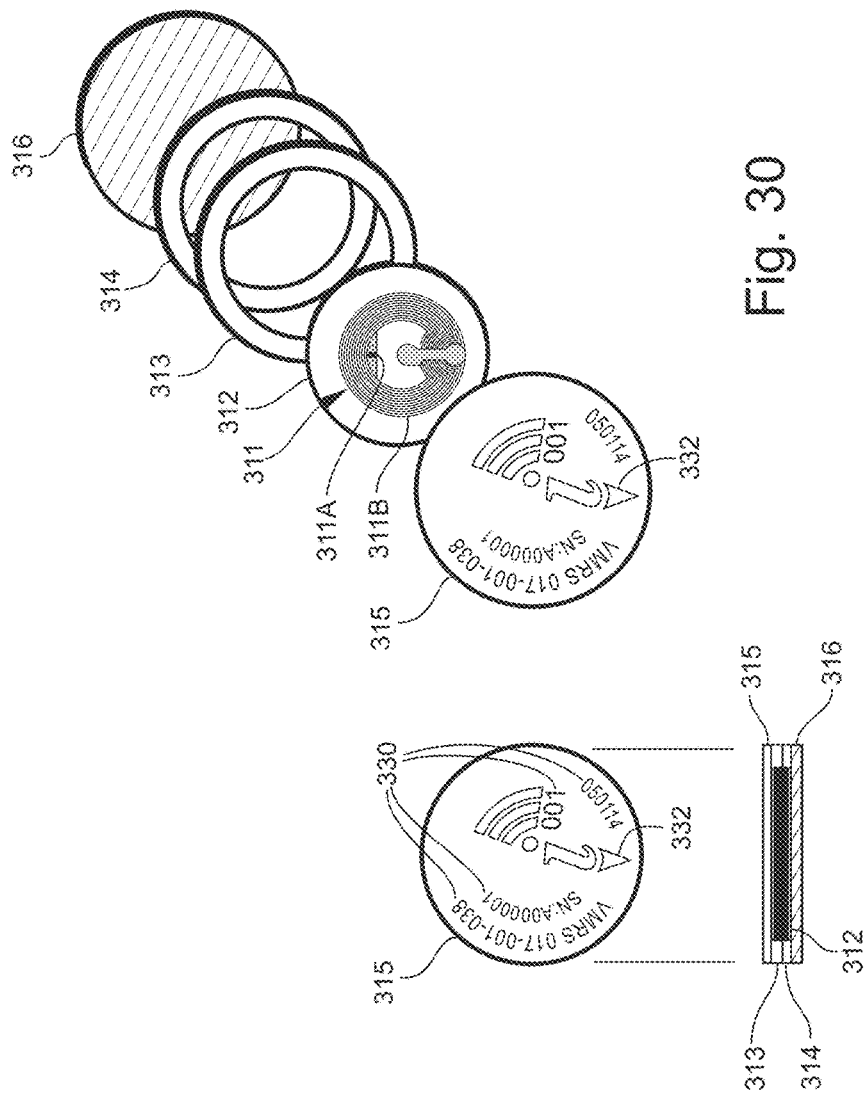

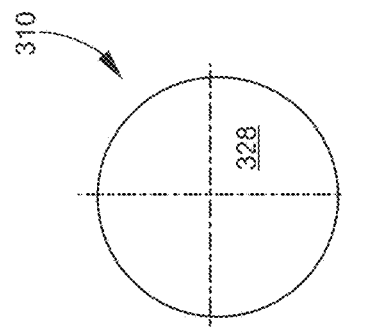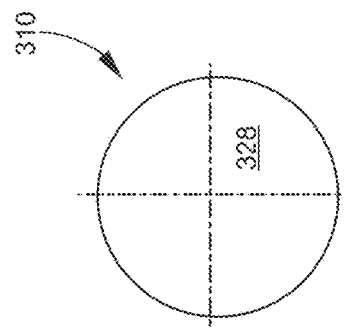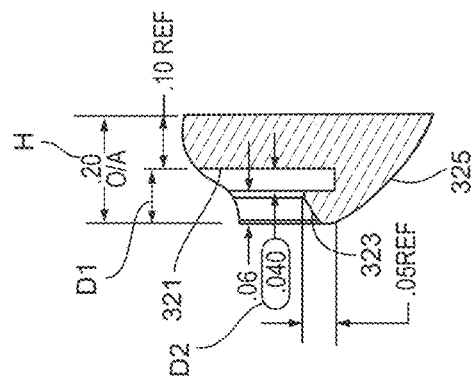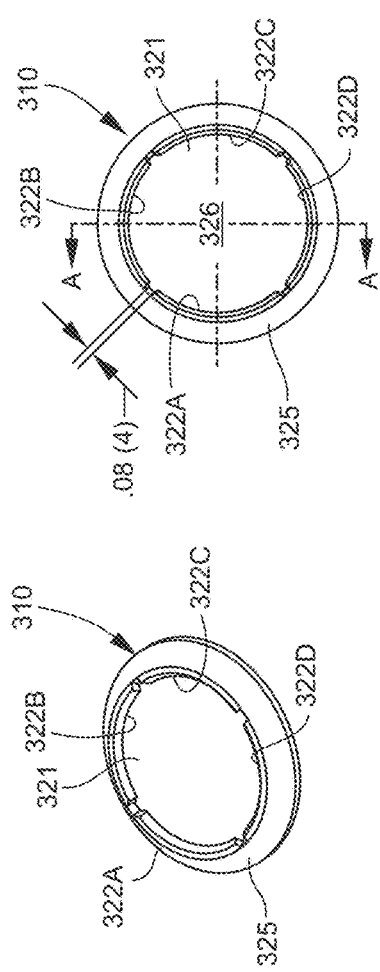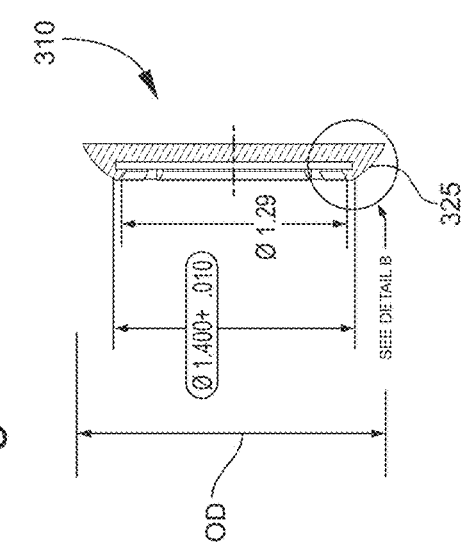

METHOD FOR COMMUNICATING DATA BETWEEN AN NFC-ENABLED DEVICE ON A VEHICLE AND A DRIVER INDENTIFICATION DEVICE

TECHNICAL FIELD AND BACKGROUND OF THE INVENTION

This invention relates broadly and generally to method for communicating data between an NFC-enabled device on a vehicle and a mobile computing device.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises a smart tag assembly designed for mounting on an object to be tracked (e.g., identified, inspected, documented, or the like). The smart tag assembly comprises a multiple layer RFID laminate adapted for electronically storing and processing data, and wireless communicating data when interrogated by an RFID reader. The laminate comprises an RFID inlay including a microchip and antenna (e.g., aluminum, copper or silver) formed with a substrate, and laminated between an outside label cover and backing. A low-profile tag carrier defines a recessed pocket designed for receiving and holding the RFID laminate, and has a generally concave outside surface adapted for residing against a generally convex surface of the object to be tracked.

According to another exemplary embodiment, the tag carrier is constructed of a generally flexible elastomeric material.

According to another exemplary embodiment, the elastomeric material comprises a natural rubber.

According to another exemplary embodiment, the natural rubber has a hardness of between about 50-80 durometer.

According to another exemplary embodiment, the tag carrier is substantially disk shaped.

According to another exemplary embodiment, the tag carrier comprises an inwardly extending peripheral lip surrounding the recessed pocket and adapted for retaining and protecting the RFID laminate.

According to another exemplary embodiment, the peripheral lip comprises a plurality of equally-spaced arcuate sections defining respective chamfered top edges.

According to another exemplary embodiment, the tag carrier comprises a continuous rounded outside peripheral edge.

According to another exemplary embodiment, the tag carrier has a height dimension less than 0.25 inches and an outside diameter less than 2.0 inches.

According to another exemplary embodiment, a bottom surface of the tag carrier is textured to a depth ranging from about 0.00100 and 0.00600.

According to another exemplary embodiment, an inside surface of the recessed pocket is textured to a depth ranging from about 0.00100 and 0.00600.

According to another exemplary embodiment, an exposed surface of the label cover comprises at least one part identification code.

According to another exemplary embodiment, a spacer is attached to a bottom surface of the tag carrier, and adapted for spacing the RFID laminate from the object.

According to another exemplary embodiment, the RFID laminate further comprises at least one spacer ring surrounding the RFID inlay and substrate, and laminated between the outside label cover and backing.

In another exemplary embodiment, the present disclosure comprises a pneumatic vehicle tire in combination with a smart tag assembly affixed to the vehicle tire. The smart tag assembly is constructed as described in the exemplary embodiments discussed further herein.

According to another exemplary embodiment, indicia (e.g., a visual marking) is located on an exposed surface of said label cover and applicable for orienting said smart tag assembly relative to a center of the wheel hub.

In yet another exemplary embodiment, the present disclosure comprises a metal vehicle part in combination with a smart tag assembly affixed to the vehicle part. The smart tag assembly is constructed as described in the exemplary embodiments discussed further herein. In addition, a spacer is attached to a bottom surface of the tag carrier in order to space the RFID laminate from the metal vehicle part.

According to another exemplary embodiment, the present disclosure comprises a direct tire data collection and communication device adapted for use in a pneumatic vehicle tire. The device comprises a tire-mounted electronics module comprising a microcontroller, and at least one tire property sensor in electronic communication with the microcontroller and capable of measuring at least one operational property of the vehicle tire. Means, including program instructions executed by the processor of the microcontroller, compare the measured operational tire property to a predetermined threshold value. The threshold value defines a positive tire safety condition and a negative tire safety condition. For example, if the "threshold value" is 200 degrees F. for high tire temperature, then measurements above this value might indicate a negative tire safety condition while measurements below this threshold value might indicate a positive tire safety condition. Similarly, if the "threshold value" is 60 psi for low tire pressure, then measurements below this threshold value might indicate a negative tire safety condition while measurements above this threshold value might indicate a positive tire safety condition. Means, including program instructions executed by the processor of the microcontroller, calculates accumulated travel data of the vehicle tire while in the negative tire safety condition. A transmitter transmits the travel data to an electronic remote terminal.

According to another exemplary embodiment, the at least one operational tire property is selected from a group consisting of tire temperature, tire pressure, and rotational movement.

According to another exemplary embodiment, the tire-mounted electronics module comprises non-volatile memory for electronically storing the operational tire property.

According to another exemplary embodiment, means are provided for attaching the tire-mounted electronics module to an inside of the vehicle tire.

According to another exemplary embodiment, the means for attaching comprises an assembly bolt designed to mount the electronics module to a proximal end of a tire valve stem. The assembly bolt defines a longitudinal through-bore enabling fluid communication of the valve stem and an interior chamber of the vehicle tire.

According to another exemplary embodiment, a battery is provided for supplying an operational voltage to the tire-mounted electronics module.

According to another exemplary embodiment, means are provided for receiving a wireless wake-up signal to selectively activate the battery, and thereby supply the operational voltage to the tire-mounted electronics module.

According to another exemplary embodiment, the electronics module comprises a plurality of integrated sensors selected from a group consisting of pressure sensor, temperature sensor, acceleration sensor, and battery voltage sensor.

According to another exemplary embodiment, a (unique) module identifier is transmitted at each transmission of the travel data to the remote terminal.

According to another exemplary embodiment, the electronics module comprises means for periodically measuring temperature and pressure within an interior chamber of the vehicle tire during rotational movement of the vehicle tire.

According to another exemplary embodiment, means are provided for determining a minimum pressure value in the vehicle tire occurring from a previous static measurement to a present static measurement.

According to another exemplary embodiment, means are provided for determining a maximum temperature value in the vehicle tire occurring from a previous static measurement to a present static measurement.

According to another exemplary embodiment, the device further comprises means for periodically measuring tire pressure within an interior chamber of the vehicle tire at predetermined intervals during rotational movement of the vehicle tire, non-volatile memory for electronically storing the measured tire pressure, means for comparing the stored tire pressure to subsequent tire pressure measurements to determine a lowest measured tire pressure value, and means for wirelessly transmitting the lowest measured tire pressure value to the remote terminal.

According to another exemplary embodiment, the device further comprises means for periodically measuring temperature within an interior chamber of the vehicle tire at predetermined intervals during rotational movement of the vehicle tire, non-volatile memory for electronically storing the measured tire temperature, means for comparing the stored tire temperature to subsequent tire temperature measurements to determine a highest measured tire temperature value, and means for wirelessly transmitting the highest measured tire temperature value to the remote terminal.

In yet another exemplary embodiment, the present disclosure comprises a multi-purpose (multi-functional) handheld data collection and communication tool. The tool comprises a tool housing. A receiver is located within the housing, and is adapted for receiving tire data transmitted wirelessly by a tire pressure monitoring system (TPMS) of a pneumatic vehicle tire.

An air chuck is designed for operatively engaging and opening a self-contained valve in fluid communication with an interior chamber of the vehicle tire. Means are provided for measuring an operational tire property upon (physical) application of the air chuck to the self-contained valve of the vehicle tire. The operational tire property is selected from a group consisting of tire pressure and temperature.

According to another exemplary embodiment, a transmitter is located within the tool housing and capable of wirelessly transmitting the tire data to a remote terminal.

According to another exemplary embodiment, an RFID transceiver is located within the tool housing.

According to another exemplary embodiment, the RFID transceiver comprises two-way near field communication (NFC) technology.

According to another exemplary embodiment, non-volatile memory is provided for electronically storing the tire data.

According to another exemplary embodiment, the tool comprises an integrated USB connector.

The term "remote terminal" refers broadly herein to any Mobile Device, as described below, network server, cloud storage, desktop, laptop computer, netbook, e-reader, tablet computer, mobile phone, personal digital assistant, or other fixed or mobile electronic data processing, collection, transmission and/or storage device (programmable or non-programmable) which is physically unattached to the exemplary ITD (and/or vehicle tire within which the ITD is located) while the vehicle is in motion.

The term "tire" refers broadly to a pneumatic tire fabricated (e.g.) of synthetic rubber, natural rubber, fabric and wire, along with carbon black and other chemical compounds. The tire consists of a tread and a body. The tread provides traction while the body provides containment for a quantity of compressed air.

Exemplary Mobile Computing Device

The mobile computing device (or "Mobile Device") may incorporate or comprise any general or specific purpose machine with processing logic capable of manipulating data according to a set of program instructions. Examples of Mobile Devices include a laptop computer, netbook, e-reader, tablet computer, mobile phone, personal digital assistant, desktop, and others. In one exemplary embodiment, the Mobile Device comprises a smartphone or other high-end mobile phone using an operating system such as Google's Android, Apple's iOS4 and iOS5, Maemo, Bada, Symbian, Windows Phone, Palm, Blackberry, and others. The exemplary Mobile Device may include a high-resolution touchscreen (display screen), a web browser, high-speed data access via Wi-Fi and mobile broadband, and advanced application programming interfaces (APIs) for running third-party applications. The Mobile Device may also be equipped with NFC, and paired with NFC tags or stickers which can be programmed by NFC apps and other mobile apps on the device. For example, BlackBerry devices support NFC using BlackBerry Tag on a number of devices running BlackBerry OS 7.0 and greater. Microsoft has also added native NFC functionality in its mobile OS with Windows Phone 8, as well as the Windows 8 operating system. Other handheld mobile devices without built-in NFC chips may utilize MicroSD and UICC SIM cards incorporating industry standard contactless smartcard chips with ISO14443 interface, with or without built-in antenna.

The exemplary computing device may also include card slots for removable or non-removable flash and SIM cards, and may have up to 32 GB of non-volatile internal memory. One or more of the flash and SIM cards and internal memory may comprise computer-readable storage media containing program instructions applicable for effecting the present system and method for vehicle tire and parts management. As generally known and understood in the art, the flash card is an electronic flash memory data storage device used for storing digital information. The card is small, re-recordable, and able to retain data without power. For example, Secure Digital (SD) is a non-volatile memory card format developed by the SD Card Association for use in portable devices. SD has an official maximum capacity of 2 GB, though some are available up to 4 GB.

The SIM card contains an integrated circuit that securely stores the service-subscriber key (IMSI) used to identify a subscriber on the Mobile Device. SIM hardware typically consists of a microprocessor, ROM, persistent (non-volatile) EEPROM or flash memory, volatile RAM, and a serial I/O interface. SIM software typically consists of an operating system, file system, and application programs. The SIM may incorporate the use of a SIM Toolkit (STK), which is an application programming interface (API) for securely loading applications (e.g., applets) or data to the SIM for storage in the SIM and execution by the Mobile Device. The STK allows a mobile operator (such as a wireless carrier) to create/provision services by loading them into the SIM without changing other elements of the Mobile Device. One convenient way for loading applications to the SIM is over-the-air (OTA) via the Short Message Service (SMS) protocol.

Secure data or application storage in a memory card or other device may be provided by a Secure Element (SE). The SE can be embedded in the logic circuitry of the Mobile Device (e.g., smartphone), can be installed in a SIM, or can be incorporated in a removable SD card (secure digital memory card), among other possible implementations. Depending on the type of Secure Element (SE) that hosts an applet, the features implemented by the applet may differ. Although an SE is typically Java Card compliant regardless of its form factor and usage, it may implement features or functions (included in the operating system and/or in libraries) that are specific to that type of SE. For example, a UICC (Universal Integrated Circuit Card) may implement features that are used for network communications, such as text messaging and STK, whereas in certain embedded SE devices, these features may not be implemented.

Additionally, to identify a user's Mobile Device, a unique serial number called International Mobile Equipment Identity, IMEI, may be assigned to the device. As known by persons skilled in the art, IMEI is standardized by ETSI and 3GPP, and mobile devices which do not follow these standards may not have an IMEI. The IMEI number is used by the network to identify valid mobile devices. IMEI identifies the device, not the user (the user is identified by an International Mobile Subscriber Identity, IMSI), by a 15-digit number and includes information about the source of the mobile device, the model, and serial number. Other features of the exemplary Mobile Device may include front-facing and rear-facing cameras, Dolby Digital 5.1 surround sound, video mirroring and video out support, built-in speaker and microphone, built-in 25-watt-hour rechargeable lithium-polymer battery, and sensors including three-axis gyro, accelerometer, and ambient light sensor.

The exemplary Mobile Device may also combine A-GPS and other location services including Wi-Fi Positioning System and cell-site triangulation, or hybrid positioning system. Mobile Phone Tracking tracks the current position of a mobile device, even when it is moving. To locate the device, it must emit at least the roaming signal to contact the next nearby antenna tower, but the process does not require an active call. GSM localization is then done by multilateration based on the signal strength to nearby antenna masts. Mobile positioning, which includes location based service that discloses the actual coordinates of a mobile device bearer, is a technology used by telecommunication companies to approximate where a mobile device, and thereby also its user (bearer), temporarily resides.

BRIEF DESCRIPTION OF THE DRAWINGS

Exemplary embodiments of the present invention will hereinafter be described in conjunction with the following drawing figures, wherein like numerals denote like elements, and wherein:

FIG. 17 is a top view of the exemplary Hand Tool;

FIG. 18 is a cross-sectional view of the exemplary Hand Tool taken substantially along line C-C of FIG. 17;

FIG. 30 is an exploded perspective view of the multiple layer RFID laminate;

FIG. 31 is a cross-sectional view of the exemplary RFID laminate;

FIG. 32 is a perspective view of the exemplary low-profile tag carrier;

FIG. 33 is a top view of the exemplary tag carrier;

FIG. 34 is a bottom (underside) view of the exemplary tag carrier;

FIG. 35 is a cross-sectional view of the exemplary tag carrier;

FIG. 36 is an enlarged, fragmentary cross-sectional view of the exemplary tag carrier;

Figure 1:
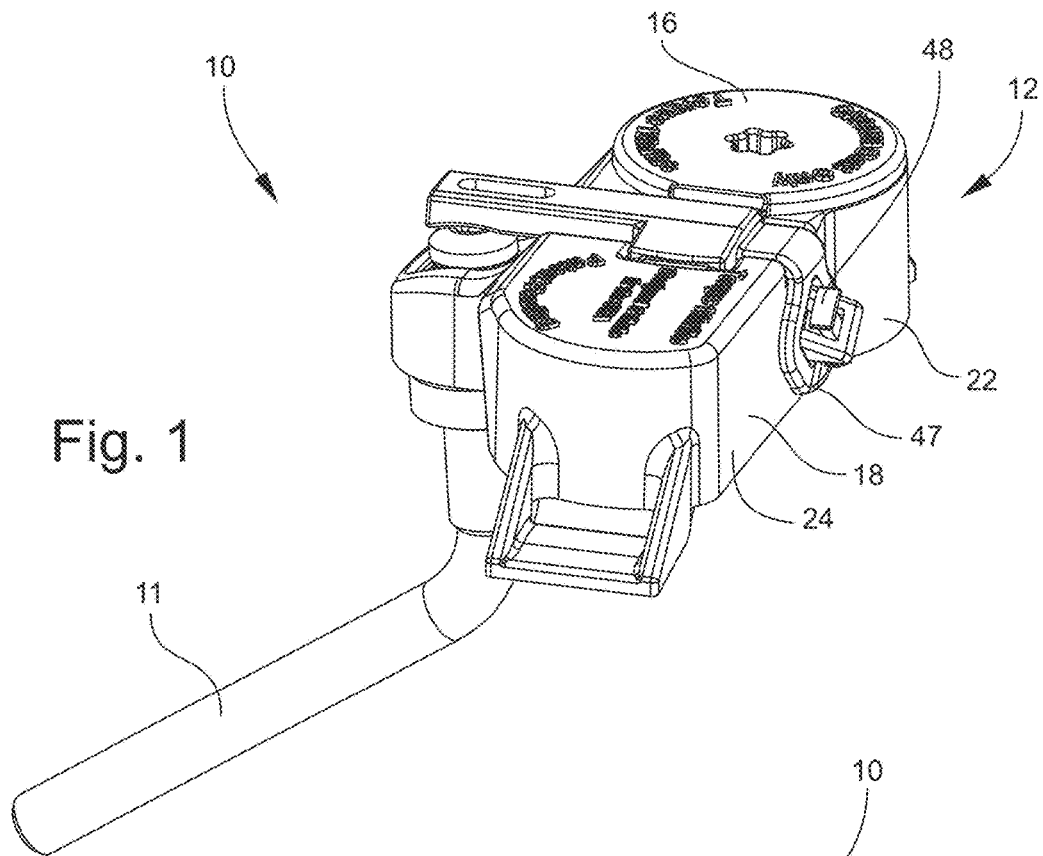
FIG. 1 is a perspective view of an exemplary In-Tire Data Collection and Communication Device (ITD) according to one embodiment of the present disclosure.
Figure 2:
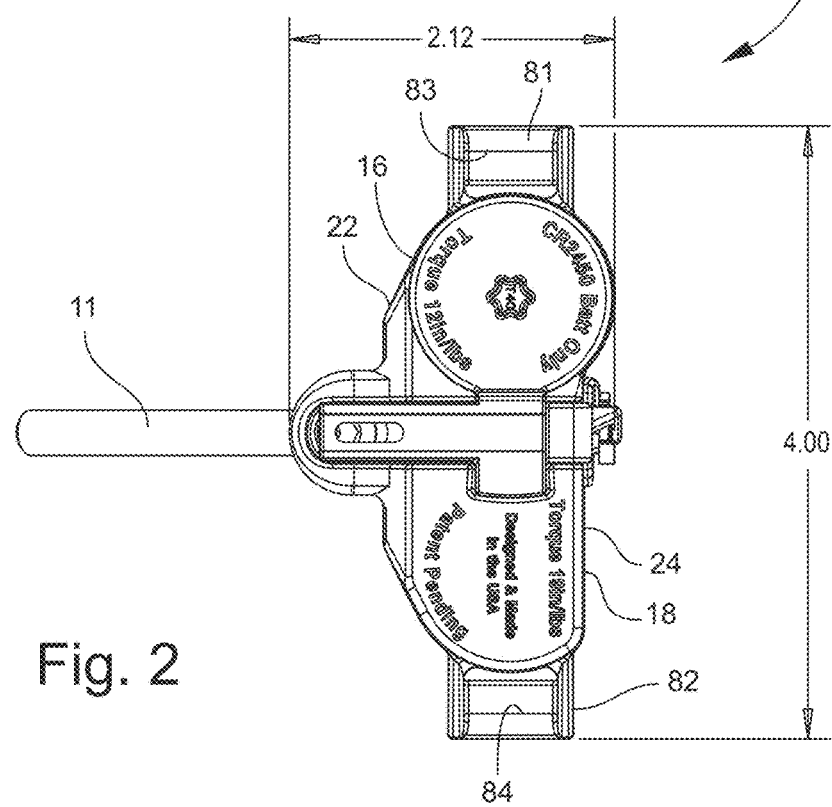
FIG. 2 is a plan view of the exemplary ITD.
Figure 3:
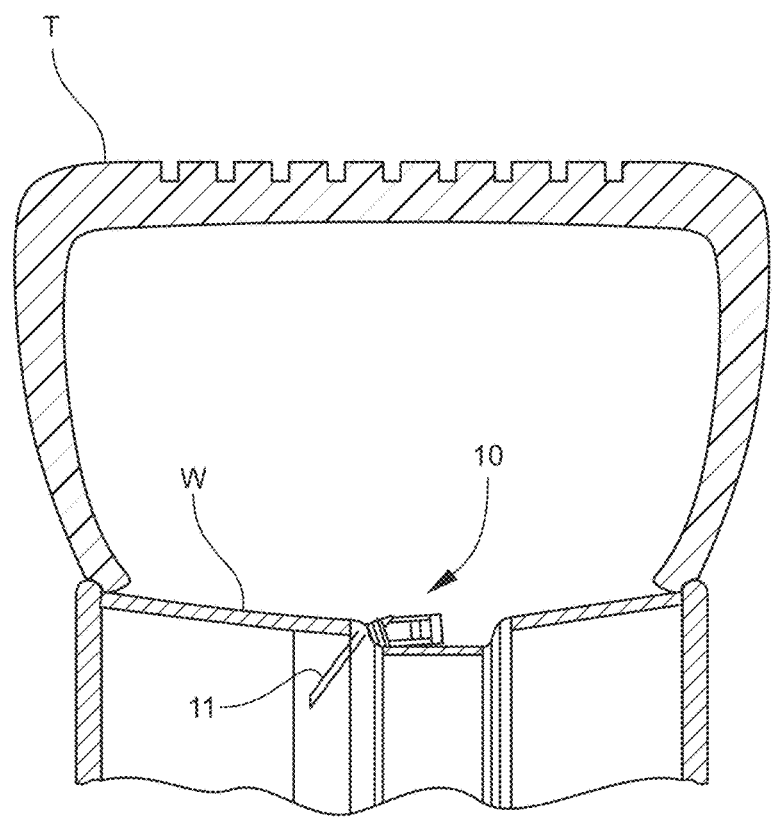
FIG. 3 is an environmental view of the exemplary ITD.

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now specifically to the drawings, the present disclosure comprises an exemplary system and method for communicating data (e.g., tire data) between a vehicle tire and a remote (or unattached) computing device. In various embodiments described below, the system and method utilize one or both of the exemplary In-Tire Data Collection and Communication Device (or simply, "ITD") and Multi-Purpose Handheld Data Collection and Communication Tool (or simply, "Hand Tool" or "Tool"). These concepts of the present disclosure are discussed separately below.

I. In-Tire Data Collection and Communication
Device

Referring to FIGS. 1-4, the exemplary In-Tire Data Collection and Communication Device (ITD) 10 mounts to a metal wheel "W" of the vehicle (FIG. 3), and comprises an elongated clamp-in metal valve stem 11 with an integrated valve core in fluid communication with the interior chamber of a pneumatic tire "T", and a programmable in-tire electronics module 12. The valve stem 11 may function in a conventional manner as a self-contained valve which opens to admit or release air (or other gas) to and from the sealed tire chamber, and is then automatically closed and kept sealed by the pressure in the chamber, or a spring, or both, to prevent the gas from escaping. The ITD electronics module 12 is attached to a proximal end of the value stem 11 inside the vehicle tire "T" and resides adjacent the rim bed of the wheel "W" The distal end of valve stem 11 projects through a sealed opening in the wheel rim, and may have a straight or bent configuration extending to a point outside the tire "T" adjacent the wheel center. An external retaining nut and rubber valve grommet (not shown) may be used to seal the valve stem 11 against the wheel "W" at the stem opening. The valve stem 11 may be situated in any suitable manner for convenient access when manually adjusting tire pressure, and when checking pressure by hand using digital or mechanical gauges.

In one exemplary embodiment, the ITD electronics module 12 comprises separate battery and sensor compartments 16 and 18. The battery 19 and primary electronic components of the ITD 10 are carried on a PCB assembly 20 (FIG. 4) within these compartments 16, 18, respectively. The board of the PCB assembly 20 defines a floor of the electronics module 12, and is covered by integrally-joined (e.g., molded) housing caps 22 and 24. The joined housing caps 22, 24 are secured to the board by threaded screws "S" or other hardware.

Figure 4:
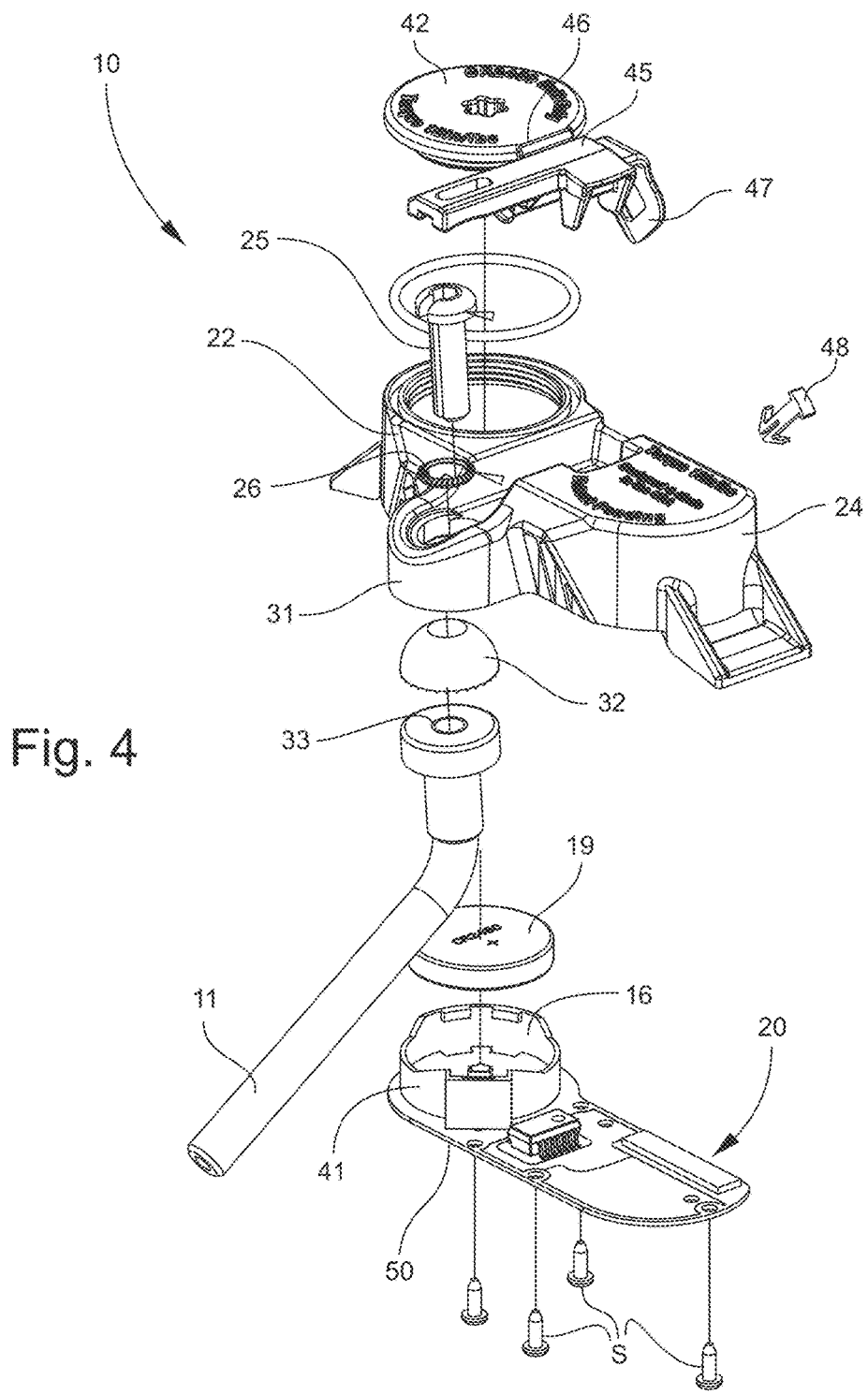
FIG. 4 is an exploded view of the exemplary ITD.
Figure 5:
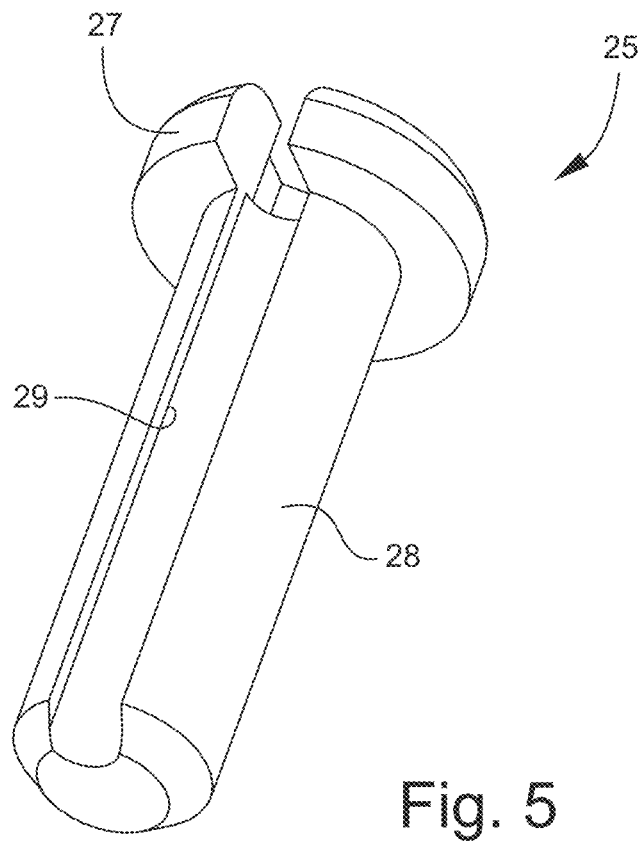
FIG. 5 is a perspective view of an thru-flow assembly bolt adapted for use in the exemplary ITD.
Figure 6:
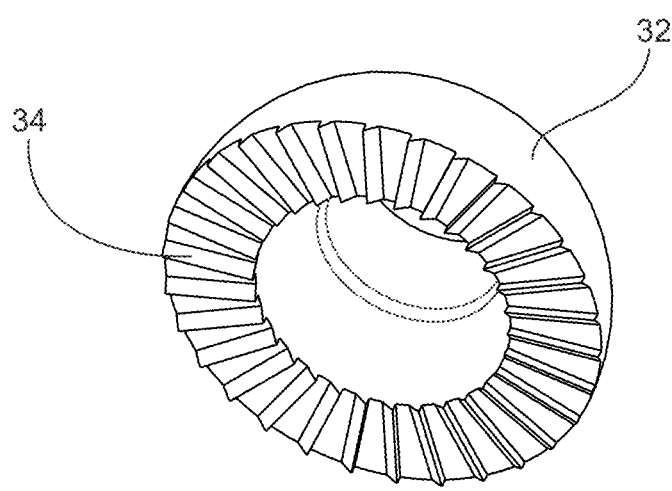
FIG. 6 is a perspective view of a socket adapter applicable for use in the exemplary ITD.

As best shown in FIGS. 4 and 5, the ITD electronics module 12 is removably attached to the valve stem 11 using an elongated assembly bolt 25 and locking (e.g., Nord-Lock®) washer 26. The assembly bolt 25 has an enlarged head 27, externally-threaded shaft 28, and a longitudinal through-bore 29. The bolt 25 inserts through a top side of a cup-shaped stem connector 31 integrally formed between the housing caps 22, 24 of the battery and sensor compartments 16, 18. The threaded bolt shaft 28 extends from the ITD electronics module 12 through a semi-spherical polymer (e.g., ABS) socket adapter 32, and into a complementary threaded opening 33 formed with the proximal end of the metal valve stem 11. The opening 33 may be drilled and tapped in an otherwise conventional valve stem 11. The exemplary socket adapter 32 sits within the cup-shaped stem connector 31 and has textured (grit) spherical surface and a radially-serrated flat surface 34 (FIG. 6) which engages the flat proximal end of the valve stem 11. The socket adapter 32 enables proper sizing, and slight shifting and flexing of the assembled components for thermal, vibration, and shock sensitivity. The longitudinal through-bore 29 of the threaded bolt 25 defines an air passage enabling fluid communication between a sealed air chamber formed with the valve stem 11 and interior of the pneumatic tire "T".

The battery compartment 16 of the electronics module comprises an annular interior wall 41 formed with the circuit board assembly 20, and defining a protected area for securely holding the replaceable or rechargeable snap-in coin cell battery 19. The coin cell battery may comprise a lithium 3-volt battery. Under normal conditions, the battery life may be 5 years or more. When assembled, the cap 22 of the battery compartment 16 sits closely adjacent the board-mounted compartment wall 41, and is removably covered and sealed by a threaded top 42 and O-ring 43. The threaded top 42 mates with a complementary internal thread formed with the cap 22 of the battery compartment 16. Alternatively, the threaded top 42 may be ultrasonically welded to the battery compartment housing in order for re-manufacturing or servicing the battery by certified personnel. The threaded top 42 may also comprise an integrally-hinged bolt retainer 45 designed to pivot at hinge 46 (e.g., "living hinge") into a locking position over the enlarged head 27 of the assembly bolt 25 to safely hold the bolt 25 in place during operation of the vehicle. Proper positioning of the bolt retainer 45 also ensures sufficient torque applied to the threaded top 42 of the battery compartment 16. A flexible flap 47 integrally-formed with the bolt retainer 45 defines an opening for receiving a secondary locking clip 48 attached to the ITD housing.

As indicated above, the electronics of the ITD 10 are mounted on the PCB assembly 20 and located primarily within the sensor compartment 18 defined by cap 24 of the ITD electronics module 12. The PCB antenna may reside in a separately formed subcompartment of the cap 24, and may not be potted directly on the board. In one embodiment, the electronics module 12 comprises a programmable, high integrated, Tire Pressure Monitoring System (TPMS) sensor 50, shown in FIGS. 4 and 7, with a low power embedded programmable microcontroller 51 and wireless FSK/ASK RF transmitter 52 with antenna. The RF transmitter 52 can operate in either the 315 or 433-434 MHz frequency bands and can be configured for an output power of either 5 or 8 dBm. One example of a suitable TPMS sensor 50 is that manufactured by Infineon Technologies AG and sold under the product designation "SP37" Other examples of suitable TPMS's are described in Pending U.S. Patent Application Publication No. 20110163737 entitled "Tire Pressure Measurement System with Reduced Current Consumption". One or more TPMS sensors 50 may be located in a single tire "T", and function to determine information concerning the interior air chamber of the tire. Block diagrams of the exemplary TPMS sensor 50 are represented at FIGS. 7 and 8.

In addition to the above, the exemplary TPMS sensor 50 contains a low frequency receiver 55 with antenna operating at 125 kHz, power supply management 56, ND converter 57, flash 58, and ROM 59. Various functions of the LF receiver 55 such as AGC, filtering, carrier detection, and data recovery are included in the ITD 10 as shown in FIG. 9.

Figure 7:
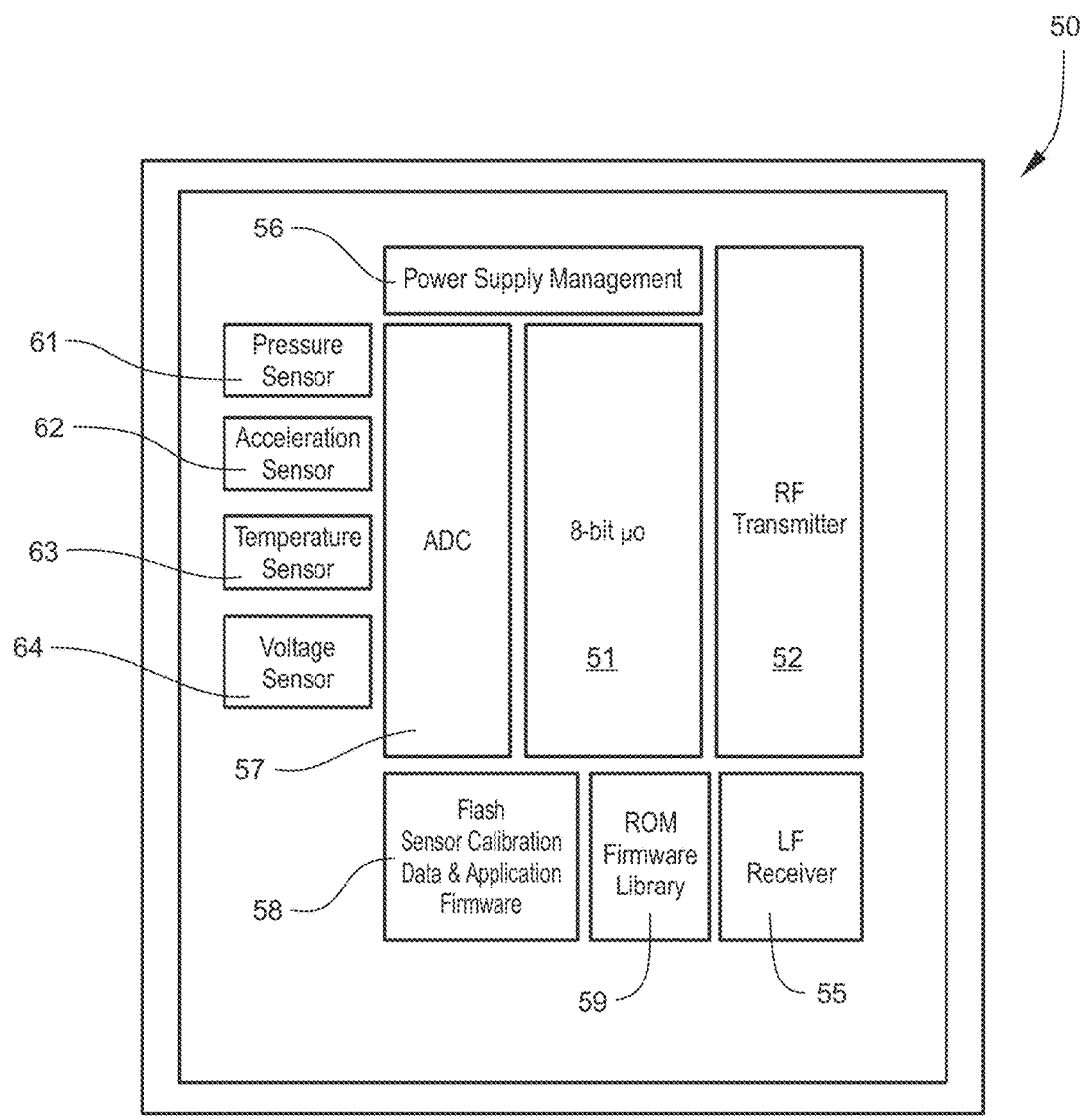
FIG. 7 is a block diagram illustrating hardware components of the TPMS sensor adapted for use in the exemplary ITD.
Figure 8:
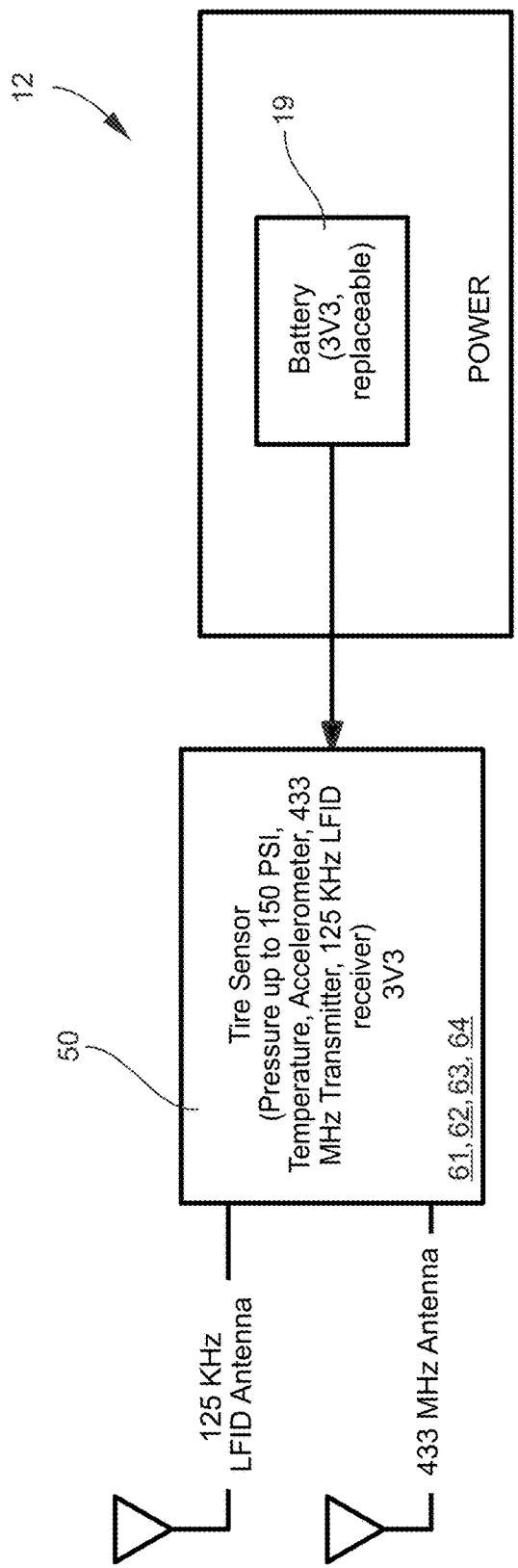
FIG. 8 is a further block diagram illustrating power connection to the exemplary TPMS sensor.
Figure 9:
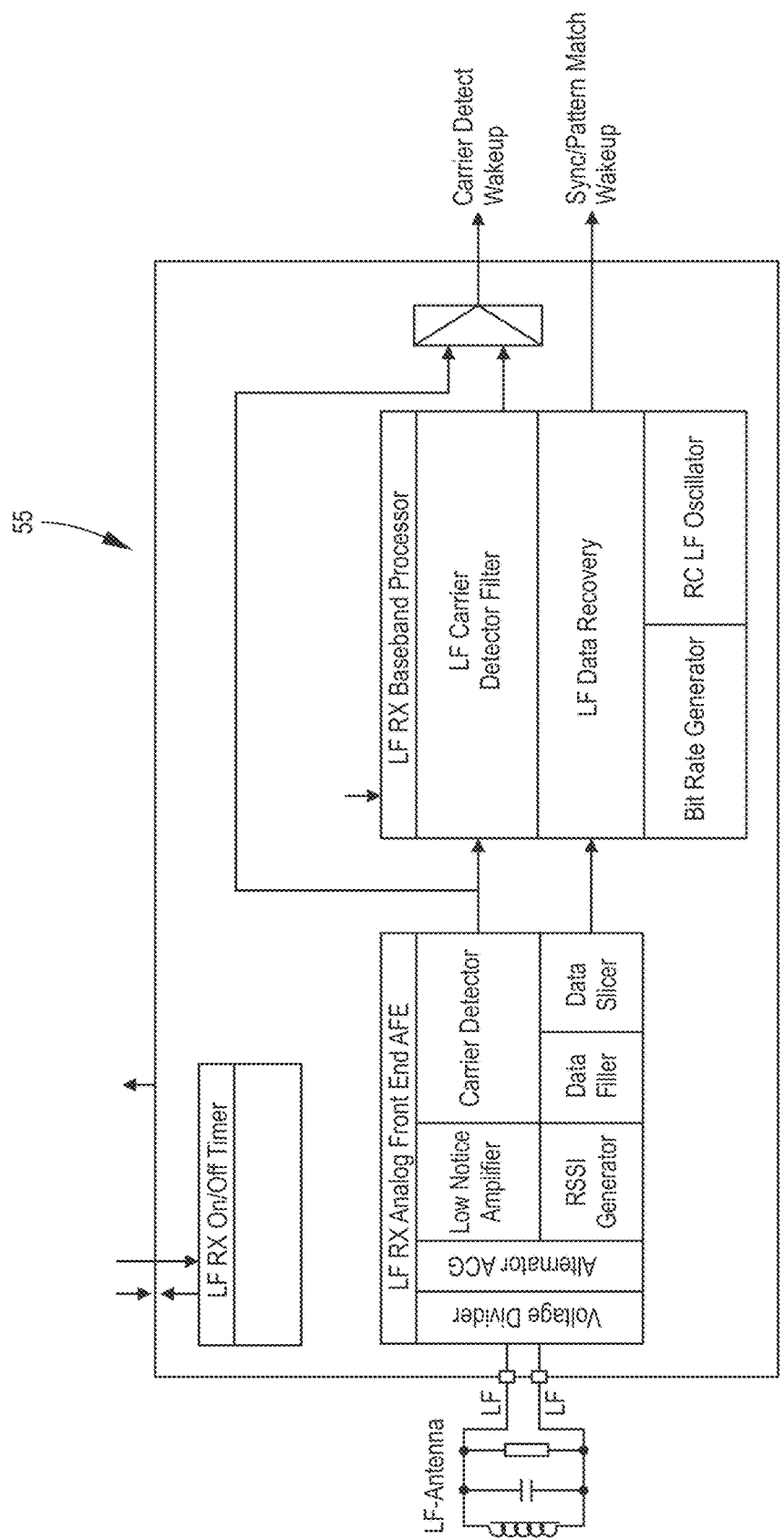
FIG. 9 is a diagram representing the LF receiver of the exemplary ITD.
Figure 10:
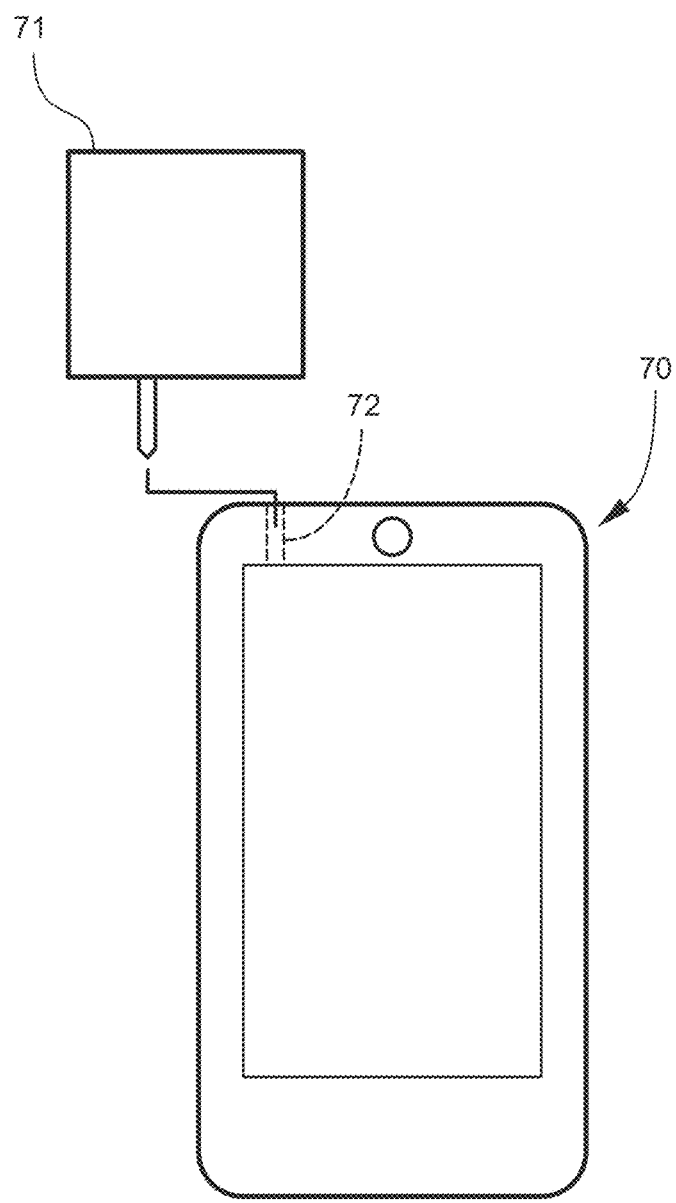
FIG. 10 is a view of an exemplary Mobile Device incorporating an externally-housed electronics module designed for plugging into the audio jack of the Mobile Device.
Figure 11:
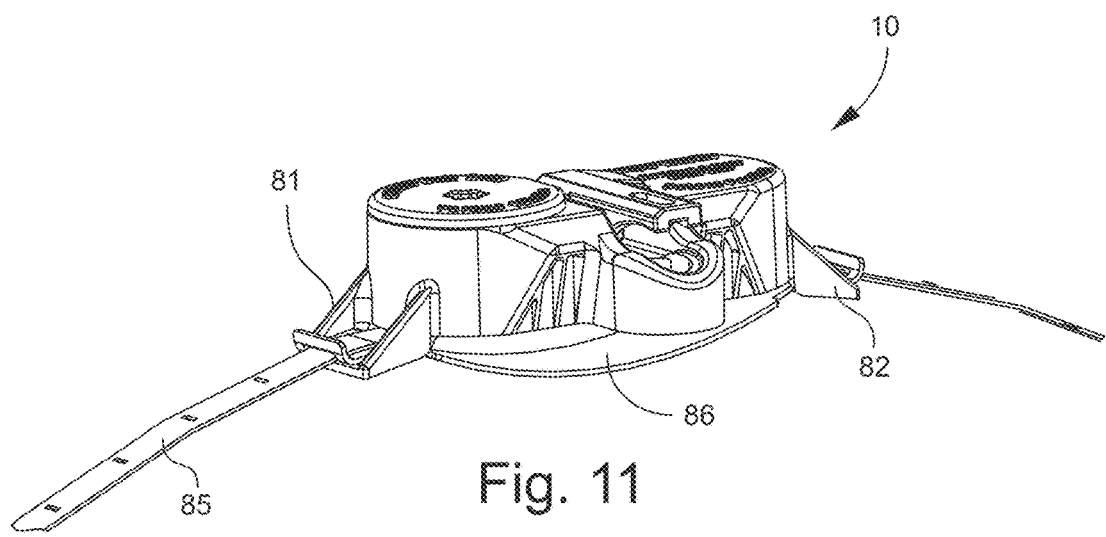
FIG. 11 is a perspective view of the exemplary ITD with attached mounting band and rim spring applicable for securing the ITD to a conventional aluminum wheel.
Figure 12:
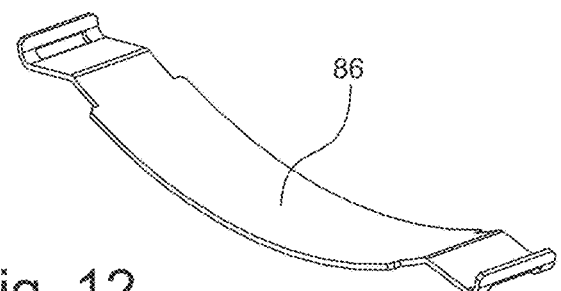
FIG. 12 is a perspective view of the rim spring.

Referring to the block diagrams at FIGS. 7, 8, and 9, the exemplary TPMS in electronics module 12 comprises integrated sensors 61, 62, 63, and 64 which function to measure vehicle tire data including pressure, acceleration, and temperature (61-63, respectively). Voltage sensor 64 measures supply (battery) voltage. To conserve battery power, the ITD electronics module 12 remains in a low power or "sleep" mode until awakened by a triggering event. In one implementation, the triggering event is a threshold motion value determined by the acceleration sensor 62 of the ITD electronics module 12. For example, the electronics module 12 may automatically activate upon a single revolution (or multiple revolutions) of the vehicle tire "T". In another implementation, the electronics module 12 is awakened on-demand by a low frequency (LF) signal (e.g., 125 kHz) wirelessly transmitted by a mobile handheld device, such as the present Tire Data Collection and Communication Tool (or simply "Hand Tool") described below, and received by the LF receiver 55. The present ITD 10 may function in combination with the exemplary Hand Tool and/or the Mobile Device described above. Referring to FIG. 10, the exemplary Mobile Device 70 may comprise a smartphone, tablet computer, or other mobile device with integrated and/or externally connected hardware (such as transponders, transverters, repreaters, transceivers, transmitters, receivers, antennas, and the like), software, firmware, wireless technology including Wi-Fi and Bluetooth, and NFC and other RFID standards enabling wireless transmission and receipt of signals and data (NFC tag reading/rewriting) at 125 kHz, 13 MHz, 315 MHz, 433-434 MHz, and other frequencies. Each of the above hardware, firmware, and software components and technologies may be integrated in a single module 71 which may plug directly into the audio jack 72 of the Mobile Device 70, as shown in FIG. 10. Once activated, the ITD electronics module 12 periodically measures current temperature and pressure of the pneumatic tire "T", and stores maximum temperature and minimum pressure values in its integrated (non-volatile) flash memory 58. Current (e.g., realtime) pressure readings may be automatically adjusted to account for temperature conditions inside the tire "T". In an alternative embodiment (not shown), the ITD electronics module may be awakened using a portable magnet positioned by the user in close proximity to the ITD to activate a Reed switch (or similar) incorporated in the ITD electronics module. A second Reed switch (or similar) may also activate the ITD battery voltage sensor. For example, in a low-battery condition, the exemplary Hand Tool 100 described below may trigger a red LED while a sufficiently charged ITD battery may trigger a green LED.

In addition to the above, the vehicle tire "T" may include one or more tread temperature sensors (not shown) embedded in a rubber layer of the tire, such as described in prior U.S. Pat. No. 6,921,197 entitled "Method and system for measuring temperature and monitoring vehicle tire operation, and vehicle tire and method for introducing a temperature sensor into a vehicle tire." The complete disclosure of this prior patent is incorporated by reference in the present application. The exemplary tread-embedded temperature sensor may comprise an active or passive transponder (e.g., RFID or NFC tag) with an integrated temperature sensing element. The transponder may periodically transmit tread temperature data to the to the ITD electronics module 12, or may transmit on-demand directly to the Mobile Device 70 when reading the ITD electronics module 12. Other sensors in the vehicle tire may measure properties including tire flexing and lateral displacement. An acceleration sensor (accelerometer) may also function to determine proper balancing and/or alignment of the tire/wheel assembly, and the need for balancing products (e.g., active weight arm) in the sensor or tire.

Basic exemplary processing logic for determining maximum tire temperature and minimum tire pressure may be represented as follows:

---
Maximum Temperature Reading

Tmax ← R1
for each temperature reading Tn using ITD (Reading (R) > 1) do
   if Tn > Tmax, then
      Tmax ← Tn
return Tmax

--- where "←" is a shorthand for "changes to". For example, "Tmax←Tn" means that the value of maximum temperature changes to the value of the current reading.

"return" terminates the algorithm and saves the value that follows to the ITD non-volatile flash memory. Each new Tmax replaces the prior Tmax in memory.

---
Minimum Pressure Reading

Pmin ← R1
for each tire pressure reading Pn using ITD (Reading (R) > 1) do
   if Pn < Pmin, then
      Pmin ← Pn
return Pmin

--- where "←" is a shorthand for "changes to". For example, "Pmin←Pn" means that the value of minimum pressure changes to the value of the current reading.

"return" terminates the algorithm and saves the value that follows to the ITD non-volatile flash memory. Each new Pmin replaces the prior Pmin in memory.

Additionally, the programmable ITD microcontroller 51 may calculate time and distance traveled by the vehicle tire "T" when above a predetermined threshold temperature and below a predetermined threshold pressure. For example, for a 295/75r22.5 size, 16 ply rating, heavy duty pneumatic tire, the threshold high temperature value may be 200 degrees F. and the threshold low tire pressure may be 60 psi. While the vehicle is in motion, the ITD electronics module 12 periodically measures temperature and pressure of the tire "T". Measurement intervals may be in user-defined seconds, minutes or hours; or may be determined by distance traveled. For example, in one implementation tire pressure and temperature measurements are taken at each mile traveled by the vehicle. The measurement sampling period and other criteria may be pre-programmed by the user in the ITD electronics module 12 via Mobile Device 70 prior to mounting to the vehicle wheel. If the temperature value exceeds the high temperature threshold, then the ITD electronics module 12 initiates a realtime clock (RTC) which adds the time [in hours and/or minutes] during which the vehicle travels with the tire "T" in the pre-determined high temperature condition. The electronics module 12 also calculates an accumulated distance traveled by the tire "T" [in miles and/or feet] while in the high temperature condition. The time and distance traveled while above the high temperature threshold may be accumulated, respectively, over the entire life of the tire "T". These values may be permanently stored in the electronics module 12 of the ITD 10.

Basic exemplary processing logic for calculating the high-temperature time and distance values may be represented as follows:

---
Distance and Time Traveled Above Threshold High Temperature read tire temperature Tn by ITD at measurement interval
   while Tn is greater than Thigh do
      accumulate time Ttime
      accumulate distance Tdistance
return Ttime and Tdistance

--- where "Thigh" is a pre-configured threshold high temperature value.

"return" terminates the algorithm and saves the value that follows to the ITD non-volatile flash memory.

Similarly, if the tire pressure value drops below the low pressure threshold, the ITD clock adds the time [in hours and/or minutes] during which the vehicle travels (actual motion) with the tire in this low pressure condition. The ITD electronics module 12 also calculates an accumulated distance traveled by the tire "T" [in miles and/or feet] while in the low pressure condition. The time and distance traveled while below the low pressure threshold may be accumulated, respectively, over the entire life of the tire "T". These values may be permanently stored in the electronics module 12 of the ITD 10.

The basic processing logic for calculating the low-pressure time and distance values may be represented as follows:

---
Distance and Time Traveled Below Threshold Low Pressure read tire pressure Pn by ITD at measurement interval
   while Pn is less than Plow do
      accumulate time Ptime

| Distance and Time Traveled Below Threshold Low Pressure |
| --- |
| accumulate distance Pdistance<br>return Ptime and Pdistance | where "Plow" is a pre-configured threshold low pressure value.

"return" terminates the algorithm and saves the value that follows to the ITD non-volatile flash memory.

In addition to the tire data discussed above, the exemplary ITD electronics module 12 stores a unique identification number (code or symbol), and when awaked by the LF signal, transmits this information via the module's RF transmitter 52 (e.g., at 433-434 mHz) to the user's Mobile Device 70. The unique ID allows the ITD electronics module 12 to ignore signal transmissions from unintended sources. As indicated above, the LF signal may be transmitted wirelessly on-demand by the user with any suitable Mobile Device 70 located in close proximity to the vehicle tire "T"—generally a distance less than 10 cm from the ITD for near-field proximity coupling. Once awakened, the ITD electronics module 12 wirelessly transmits its unique ID, the current battery voltage (% battery life), the current tire pressure, the current tire temperature, and other tire data stored in the ITD non-volatile memory 58 including one or more of:

(i) maximum and minimum pressure values measured since the immediate prior transmission;

(ii) maximum temperature value measured since the immediate prior transmission;

(iii) accumulated time vehicle tire has traveled while above a threshold high temperature value;

(iv) accumulated distance vehicle tire has traveled while above the threshold high temperature value;

(v) accumulated time vehicle tire has traveled while below a threshold low pressure value; and (vi) accumulated distance vehicle tire has traveled while below the threshold low pressure value.

The tire data transmitted from the ITD electronics module 12 is received by the user's Mobile Device 70 (e.g., via integrated or externally connected 433-434 MHz transceiver), and may be further transmitted by the Mobile Device 70 to other remote terminals, such as the vehicle's telematics, electronic onboard recorder, vehicle checkpoint, cloud storage, corporate office, or other location. The transmitted tire data may be date-stamped at each reading and stored in the Mobile Device's non-volatile internal memory, or on removable flash and SIM cards. After each reading, or each transmission of tire data by the ITD electronics module 12, the maximum and minimum pressure values measured since the immediate prior transmission, and the maximum temperature value measured since the immediate prior transmission are cleared from the ITD flash memory 58. The data may be cleared via LF signal transmitted by the Mobile Device 70, by touching contacts on the ITD housing to a GPIO on the electronics module 12, or by other known and suitable means. The accumulated time and distance values discussed above are permanently retained by the ITD 10, and may be wirelessly written to RFID (NFC) tags affixed to the tire "T". In this event, if the vehicle tire "T" is recycled (retreaded) the affixed NFC tag may provide valuable information regarding the condition, safety, and history of the used tire.

The exemplary ITD 10 described above is especially applicable for aluminum wheels "W", and may be designed to locate in the drop section of the wheel rim. Referring to FIGS. 2, 3, 11, and 12, in this embodiment the ITD electronics module 12 comprises opposing integrally-molded shoulders 81, 82 defining respective slots 83, 84 for receiving a stainless steel mounting band 85 (e.g., worn gear hose clamp) adapted for extending 360-degrees around the wheel rim and securing the ITD 10 to the vehicle wheel "W". The mounting band 85 passes through the slotted shoulders 81, 82 and through corresponding slots formed in a metal rim spring 86. The rim spring 86 resides between the wheel "W" and ITD electronics module 12 to accommodate thermal expansion/contraction of the steel mounting band 85 and the aluminum wheel "W".

Figures 13, 14:
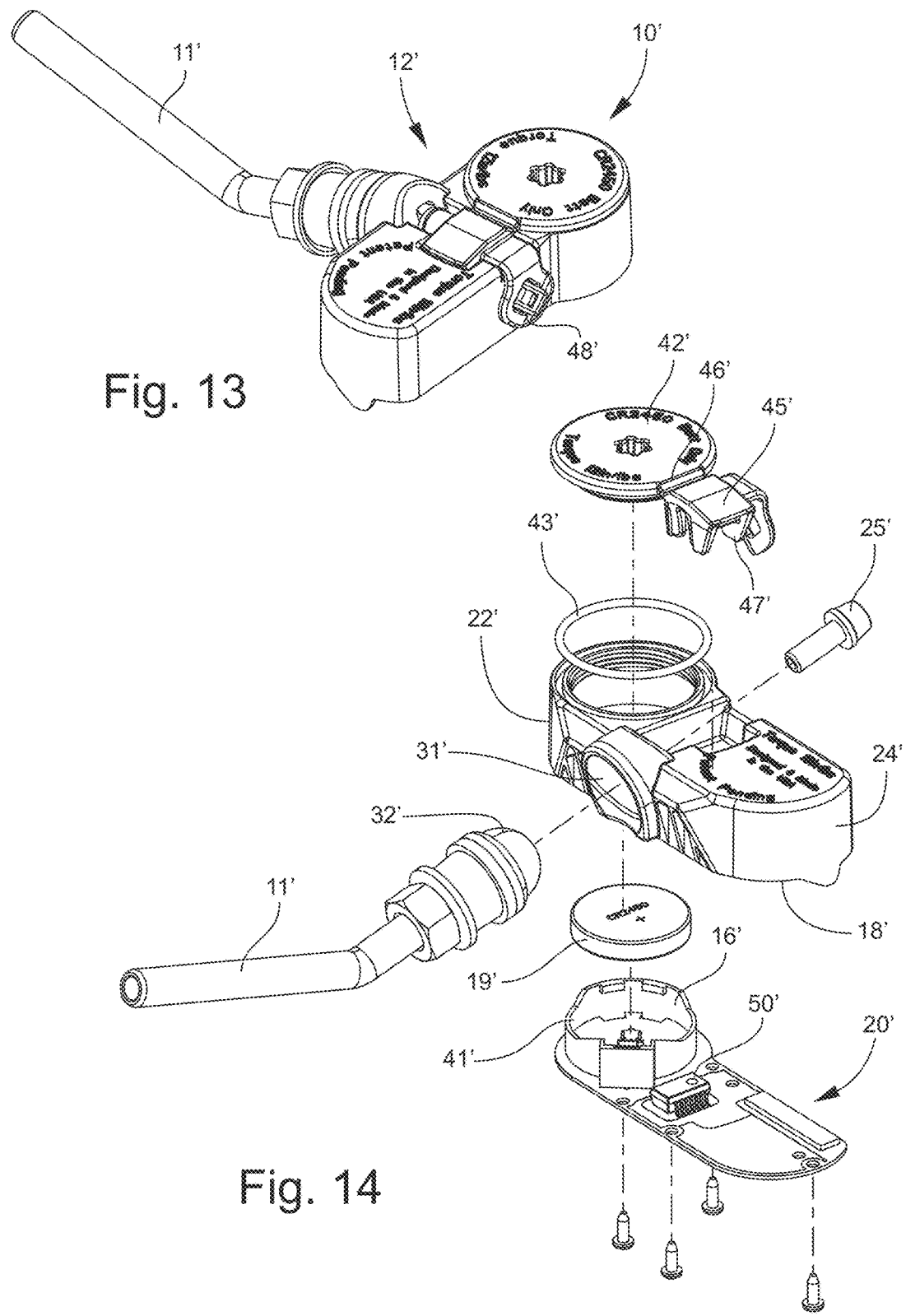
FIG. 13 is a perspective view of the ITD according to an alternative exemplary embodiment of the present disclosure.
FIG. 14 is an exploded view of the ITD shown in FIG. 13.

An alternative exemplary ITD 10' is shown in FIGS. 13 and 14. Like elements are indicated in prime notation ('). This ITD 10' is particularly adapted for steel wheels, and designed to mount flat on the wheel rim. Like the ITD 10 described above, this device 10' comprises an elongated clamp-in metal valve stem 11' with an integrated valve core in fluid communication with an interior chamber of the pneumatic tire "T", and a programmable in-tire electronics module 12'. The electronics module 12' is attached to a proximal end of the value stem 11' inside the vehicle tire and resides adjacent the rim bed of the wheel. The distal end of valve stem 11' projects through a sealed opening in the wheel rim, and may have a straight or bent configuration extending to a point outside the tire adjacent the wheel center.

The ITD electronics module 12' is removably attached to the valve stem 11' using an elongated assembly bolt 25', and comprises a programmable high integrated Tire Pressure Monitoring Sensor (TPMS) 50' with a low power embedded microcontroller and wireless FSK/ASK RF transmitter and antenna, as previously described. The ITD electronics module 12' operates in a manner identical to that described above. The assembly bolt 25' has an enlarged head, externally-threaded shaft, and a longitudinal through-bore. The bolt 25' inserts through a back side of a cup-shaped stem connector 31' integrally formed between the housing caps 22', 24' of the battery and sensor compartments 16', 18'. The threaded bolt shaft extends from the electronics module 12' through a semi-spherical polymer (e.g., ABS) socket adapter 32', and into a complementary threaded opening formed with the proximal end of the metal valve stem 11'. The battery compartment 16' of the electronics module 12' comprises an annular interior wall 41' formed with the circuit board assembly 20', and defining a protected area for securely holding the replaceable snap-in coin cell battery 19'. When assembled, the cap 22' of the battery compartment 16' sits closely adjacent the board-mounted compartment wall 41', and is removably covered and sealed by a threaded top 42' and O-ring 43'. The threaded top 42' mates with a complementary internal thread formed with the cap 22' of the battery compartment 16'. The threaded top 42' may also comprise an integrally-hinged bolt retainer 45' designed to pivot at hinge 46' (e.g., "living hinge") into a locking position over the enlarged head of the assembly bolt 25' to safely hold the bolt 25' in place during operation of the vehicle. A flexible flap 47' integrally-formed with the bolt retainer 45' defines an opening for receiving a secondary locking clip 48' attached to the ITD housing.

II. Handheld Tire Data Collection and Communication Tool

Figure 15:
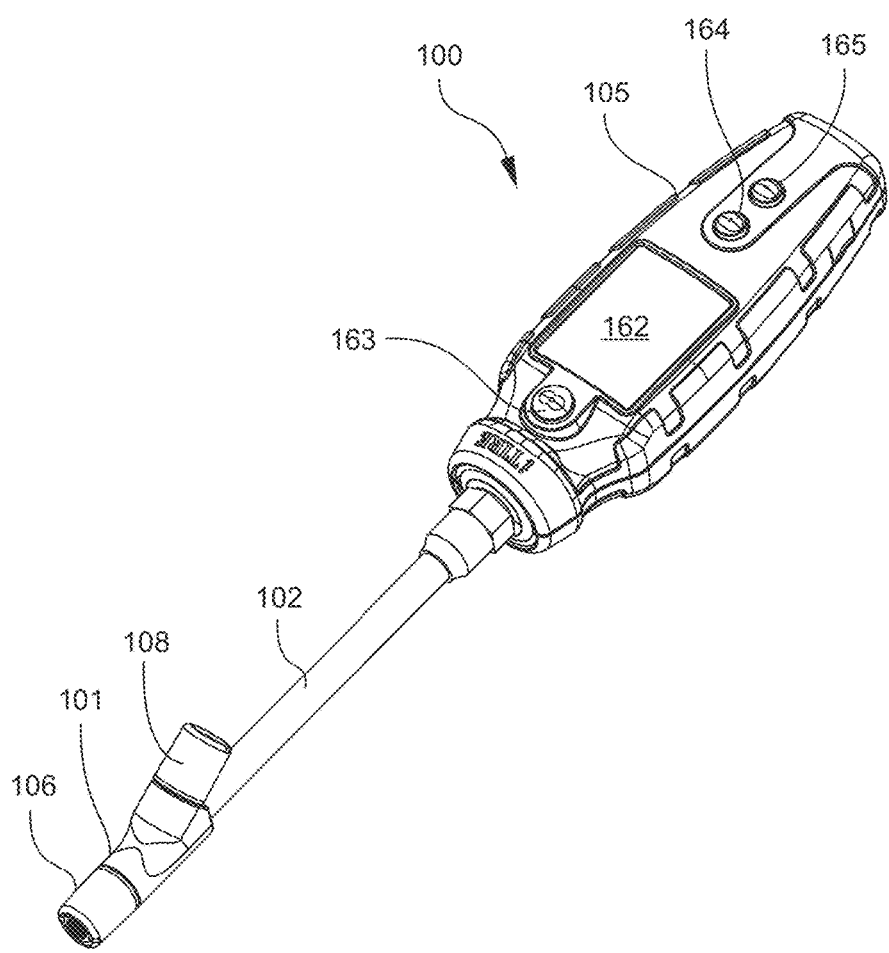
FIG. 15 is a perspective view of a Handheld Tire Data Collection and Communication Tool (Hand Tool) according to one exemplary embodiment of the present disclosure.
Figures 16A, 16B:
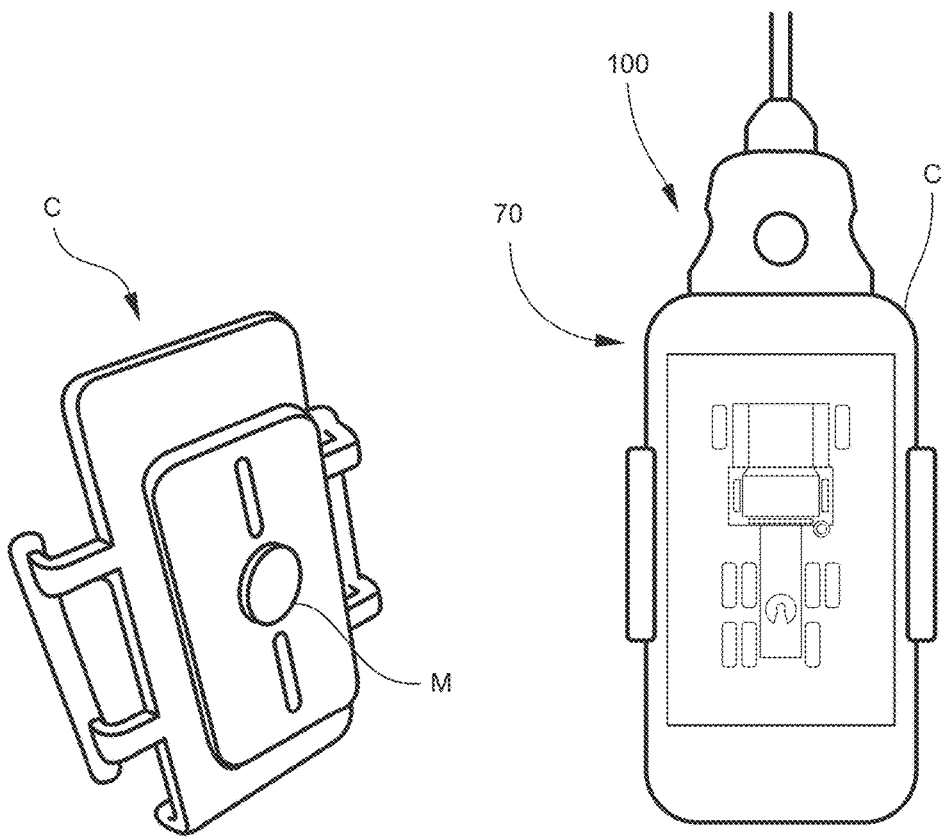
FIGS. 16A and 16B are views of the exemplary Hand Tool with a removably attached cradle for holding a Mobile Device.

In addition to the Mobile Device 70 discussed above, the exemplary ITD 10 may be activated and read using the present Handheld Tire Data Collection and Communication Tool 100 (or simply "Hand Tool" or "Tool") shown in FIG. 15. The Hand Tool 100, Mobile Device 70, and/or ITD 10 may incorporate an ultra-low power wireless system-on-a-chip with serial-to-WiFi embedded software for Wi-Fi networks. The serial-to-WiFi embedded software allows these and other devices to add Wi-Fi capabilities, thereby supporting multiple devices simultaneously with data, audio, video and control. One commercial example of the exemplary system-on-a-chip is that manufactured by GainSpan Corporation of Los Gatos, Calif., and sold under the product designation GS1011M EVK Mrk II Evaluation Kit. In an exemplary embodiment shown in FIGS. 16A and 16B, the Mobile Device 70 may be docked or integrated with the Tool 100 in a suitably designed cradle "C" with wireless (e.g., Bluetooth, WiFi or NFC) communication and inductive battery charging between the devices. The Mobile Device 70 may be releaseably secured in the cradle "C" and a cradle magnet "M" (clip, hook-and-loop fasteners, or other means) used to attach the cradle "C" to a reinforced metal battery access door of the Hand Tool 100. In one example, the battery access door may comprise a male fastener (e.g., tongue) designed to removably interlock with a complementary female fastener in the cradle "C", such that the cradle can function as a docking station for the Mobile Device 70, or as an attachment point for other accessories, such as a flexible strap or display. Cameras may also be provided in each of the docked Mobile Device 70 and Hand Tool 100 for reading two and three dimensional bar codes on tires, and/or alpha/digital labels or branded tires. This reading may then be transmitted to a remote terminal for reviewing, adding, modifying, or storing vehicle tire, vehicle or user data. The integrated camera in the Hand Tool 100 or Mobile Device 70 may also be used in combination with a comb-like measurement tool for measuring tread depth.

Referring to FIGS. 15 and 17-21, the exemplary Hand Tool 100 incorporates various electronics and wireless components applicable to the ITD 10, and can also function as a standalone (i.e., without other devices or connectivity) digital tire pressure gauge for "manually" measuring pressure and temperature in any vehicle tire "T", The exemplary Hand Tool 100 functions to accurately statically measure tire pressure ranging from 25 psi to 150 psi without any required calibration (e.g., by using an exemplary "SP-37" chip described above, and unique plastic manifold that mounts directly on the PCB with a rubber gasket or O-ring for air pressure sealing). Additionally, temperature compensation pressure readings can be normalized by knowing the temperature on or inside the vehicle tire and the ambient temperature read by the Tool 100. The exemplary Hand Tool 100 may also include two NFC tags (not shown) on the battery access door—one tag for automatic pairing with a mobile device (e.g., smartphone or table) the second tag linking to a website with detailed instructions for using the Tool 100 and its associated features and components. A third NFC tag may also be affixed to the outside or inside of a carry case for storing the Hand Tool, and may electronically communicate these same instructions to the user when the tag is read by the Tool (or other RFID reader).

Figure 19:
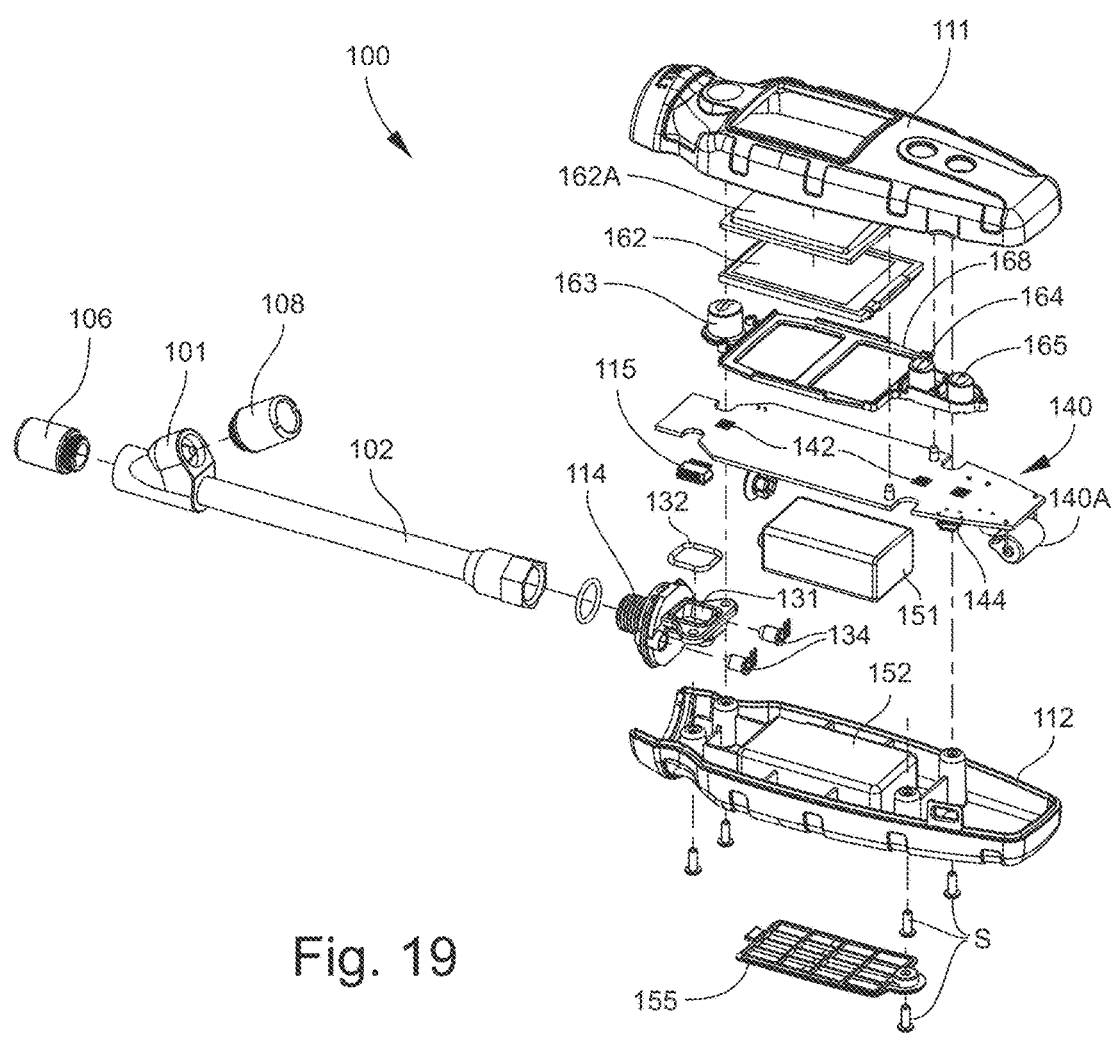
FIG. 19 is an exploded view of the exemplary Hand Tool.
Figure 20:
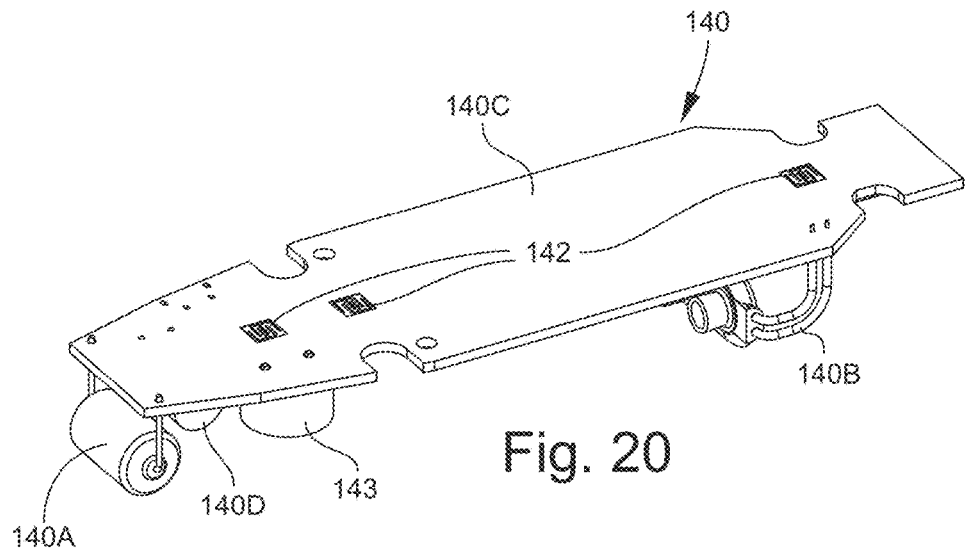
FIG. 20 is a view showing certain electronic components stored on the PCB assembly.

In one exemplary embodiment, the present Hand Tool 100 includes a dual-head air chuck 101, elongated hollow steel shaft 102, and ergonomic handle 105. Respective metal (e.g., brass) valve guides 106, 108 are attached and sealed by complementary threads to the two heads of the air chuck 101, and serve to operatively engage the valve stem 11 of the pneumatic tire "T" when using the Hand Tool 100 to manually check air pressure and/or temperature. The exemplary air chuck 101 may further incorporate a GORTEX air filter (or other suitable filter means) designed to reduce moisture and substantially prevent contaminants from entering the Tool 100 through the hollow shaft 102, and potentially damaging the "SP-37" chip. The valve guides 106, 108 are designed to operatively fit conventional inflate-thru V2B Alligator and/or Dill sealing valve caps. As best shown in FIG. 19, the exemplary tool handle 105 comprises top and bottom plastic shells 111, 112 joined together by screws "S", and cooperating to form a durable protective housing for storing interior components of the Hand Tool 100. The handle 105 includes an air manifold 114 in sealed (e.g., by O-ring) fluid communication with the steel shaft 102, and comprising an operatively connected integrated TPMS sensor 115 capable of electronically measuring pressure and temperature within the tire chamber. The TPMS sensor 115 may be identical to the TPMS sensor 50 incorporated in the ITD 10. As previously described, the exemplary TPMS sensor 115 comprises a single integrated circuit (or chip) with integrated sensors including pressure, acceleration, temperature and battery voltage, respectively; and integrated peripherals including microcontroller (8051) and other components such as flash memory, ROM, power supply management, analog-to-digital converter (ADC) for signal conditioning, low-frequency (LF) receiver, and 315/433 MHz RF transmitter. The TPMS sensor 115 resides within a recessed compartment 131 integrally formed at one end of the air manifold 114, and sealed by a rubber O-ring 132 and the top shell 111 of the handle 105 when assembled. The air manifold 114 may also include integrally molded sockets for holding respective white flashlight LEDs 134 directed towards the air chuck 101 at a distal end of the Hand Tool 100. The flashlight LEDs 134 (and other emergency red and/or amber LEDs) may be operatively connected to and activated by the tool microcontroller described below.

Figure 21:
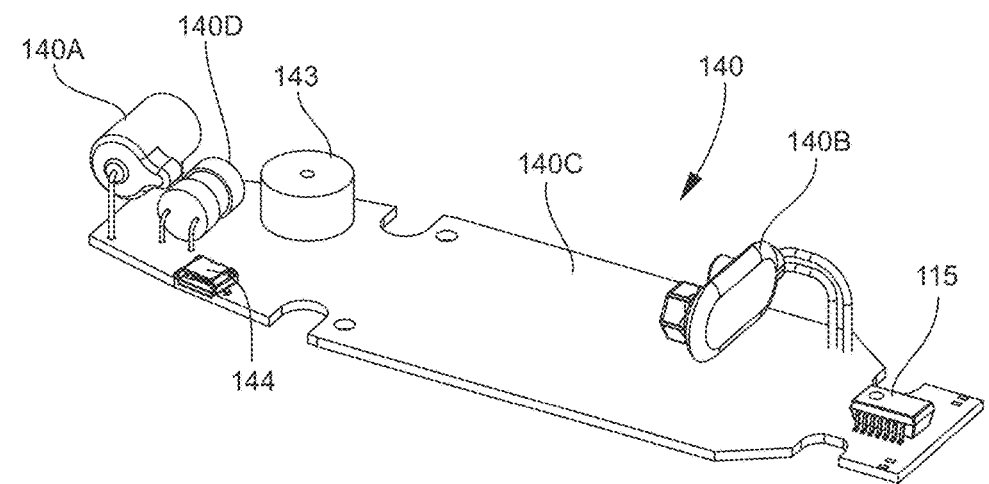
FIG. 21 is a view showing an opposite side of the PCB assembly.
Figure 22:
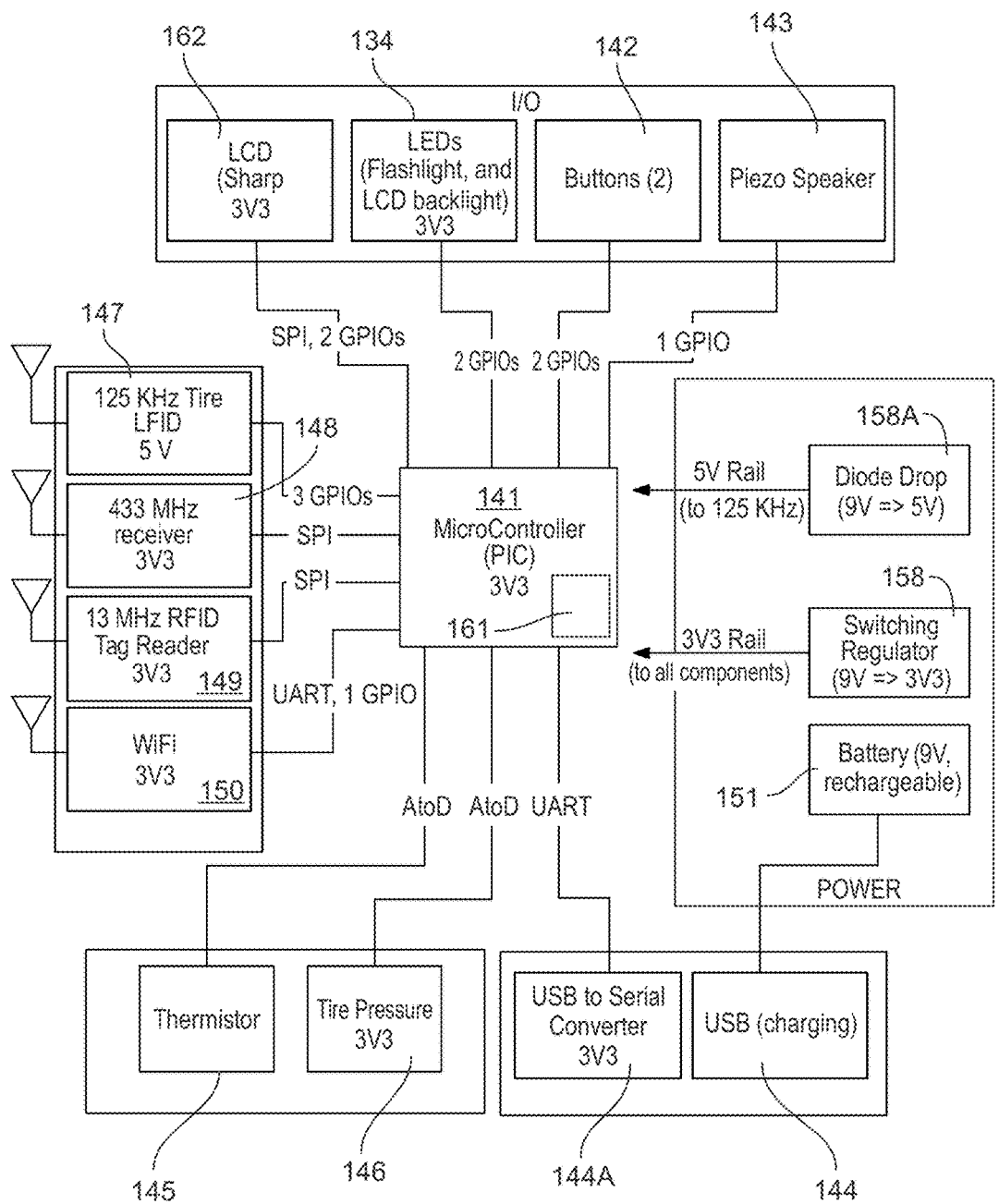
FIG. 22 is a block diagram illustrating various hardware components of the exemplary Hand Tool.

Primary electronic components of the Hand Tool 100 are carried on a PCB assembly 140 located between the top and bottom plastic shells 111, 112 of the handle 105. The exemplary shells 111, 112 may be fabricated in high-visibility yellow or other conspicuous color. The bottom shell 112 may also have a slightly concave design, such that the Hand Tool 100 can conveniently rest on top of the vehicle tire. As best shown in FIGS. 21 and 22, the exemplary PCB assembly 140 comprises an axial inductor 140A, battery strap 140B, piezoelectric buzzer 143, micro-USB charging port 144, PCB 140C, button contacts 142, TPMS sensor 115, and radial RF choke 140D. The air manifold 114 may also mount directly to the PCB assembly 140 using screws or the like. As shown in FIG. 22, the hardware block diagram of the exemplary PCB assembly 140 comprises a tool microcontroller 141, button contacts 142, piezoelectric buzzer 143, USB charging port 144 (micro-connector) and USB to serial converter 144A, temperature and pressure sensors 145 and 146, and wireless components including a 125 KHz LFID transmitter 147, 433 MHz RFID receiver 148, 13 MHz RFID (tag reader/rewriter) transceiver 149, Wi-Fi module 150, and respective antennas. One or more of these components may be integrated in the exemplary TPMS sensor described above. In addition to buzzer 143 (or alternatively), the Hand Tool 100 may incorporate a small 10 mm coin vibrator motor creating a vibrating alert which may be especially effective in noisy environments in and around the vehicle. The electronics may be powered by a 9V rechargeable, replaceable battery 151 connected to the PCB assembly 140, and stored in a battery compartment 152 defined by the bottom shell 112. The battery compartment 152 has a removable door 155 for ready access to the compartment 152 for inserting and removing the battery 151. The battery compartment door 155 may be ultrasonically welded to the bottom shell 112 in order for re-manufacturing or servicing the battery 151 by certified personnel. A 9V to 3.2V switching step-down voltage regulator 158 functions to convert the battery output voltage to the 3.2 V needed for the electrical components. The board may also comprise a 9V-5V diode drop 158A. The battery 151 may be charged via the USB micro-connector 144 and a conventional wall charger (or vehicle cigarette lighter plug-in) including battery charging protection circuitry. The battery charging circuitry can be "smart" to enable system voltages, such as 12V or 24V vehicle voltages.

The exemplary tool microcontroller 141 communicates with all peripherals of the Hand Tool 100, and comprises integrated non-volatile flash memory 161 (e.g., 256 KB-512 KB) for storing the application code, periodic tire pressure and temperature sensor readings, and other vehicle wheel and tire data. The controller memory 161 includes 32 KB+ RAM. The hardware block diagram of FIG. 22 details the following I/O applicable for communicating with targeted peripherals:

3 UARTs
1 SPI
8 GPIOs
2 analog-to-digital ports

Various input/output components of the Hand Tool 100 comprise a tool display 162 with cover 162A (and shock/vibration absorbing backing), and user control buttons 163, 164, and 165. The display 162 and buttons 163-165 are supported within the electronics housing adjacent the PCB assembly 140 by molded plastic carrier 168, such that user control buttons 163-165 operatively align with respective button contacts 142 on the board assembly 140. In one embodiment, the tool display 162 comprises a backlight-illuminated TFT LCD (Thin Film Transistor Liquid Crystal Display) which connects to the PCB assembly 140 via a ribbon cable and a ZIF (Zero Insertion Force) connector. The display screen 162 may include touchscreen and drag-and-drop features, and may be periodically refreshed by the tool microcontroller 141 to prevent image burn-in.

The exemplary Hand Tool 100 comprises three user control buttons 163-165 for measurement collection and sending, as well as lighting. The user control buttons 163-165 operatively align with contacts 142 on the PCB 140, as indicated above, and protrude through respective openings formed with the top plastic shell 112 of the tool handle 105.

The first user control "LED" button 163 performs one of the following functions each time it is pressed, and cycles to the next function when subsequently pressed:

(1) Wakes up the Hand Tool 100 from sleep mode, and puts it in ready/reading mode;
(2) Turns on the flashlight LEDs 134 and LCD backlight;
(3) Turns off the flashlight LEDs 134 and LCD backlight; and
(4) Shortens the sleep timer so that sleep is entered earlier, unless another measurement is taken or a button is pressed.

The second user control "SENSOR" button 164 functions in combination with the ITD 10 described above. The SENSOR button 164 triggers a LF (e.g., 125 Khz) signal and waits for a response from the ITD 10 in the 433 MHz band. A one-second timer is started within which a start pulse from the 433 MHz module should appear, else the Hand Tool 100 returns to its ready/reading mode. During the timeout period after the SENSOR button 164 is pressed, other actions cannot occur—meaning, NFC or pressure sensor readings are not performed. The microcontroller 141 is exclusively awaiting to bit decode a response from the ITD.

The third user control "CONNECT" button 165 puts the Hand Tool 100 in Wi-Fi mode. While in Wi-Fi mode, the Hand Tool 100 performs no function other than Wi-Fi connection setup and application layer protocol exchange. Pressing the CONNECT button 165 a second time switches Wi-Fi mode from "Adhoc" to "Infrastructure". Pressing the CONNECT button 165 a third time exits Wi-Fi mode and resumes ready/reading mode in which NFC and pressure/temperature measurements can be taken. Pressing the SENSOR button 165 during Wi-Fi mode will also exit Wi-Fi mode.

As indicated above, the wireless components of the Hand Tool 100 include a 125 KHz LFID transmitter 147, 433 MHz RFID receiver 148, 13 MHz RFID (tag reader/rewriter) transceiver 149, Wi-Fi module 150, and respective antennas. The transceiver 149 may also comprise a 315 MHz NFC reader/rewriter. One or more of these components may be integrated with the exemplary TPMS sensor 115 previously described.

Upon depressing the SENSOR button 164 of the Hand Tool 100 and holding the Tool 100 in close proximity to the tire's ITD 10 (e.g., less than 10 cm), the 125 KHz Low Frequency transmitter 147 functions to awaken the ITD electronics module 12, and thereafter initiate transmission of realtime and stored tire pressure and temperature information via the ITD's integrated 433 MHz transmitter 52. The ITD data transmission is received by 433 MHz RFID receiver 148 of the Hand Tool 100. This exemplary receiver 148 may support ISM frequency bands including 300-348 MHz, 387-464 MHz, and 779-928 MHz, as well as major modulation schemes 2-FSK, 4-FSK, GFSK, and OOK. The exemplary 13 MHz (or 125 KHz) RFID transceiver 149 is applicable for reading and writing to NFC and other radio frequency tags. The Wi-Fi module 150 functions to wirelessly transmit tire data and other information from the Hand Tool 100 to an end device (e.g., smartphone, laptop, tablet, PC, or other computing device) which may in turn send the tire data and information on to a back-end or cloud server. The exemplary end device may run either Apple or Android 10S, and may be capable of connecting to the Wi-Fi module on the Hand Tool 100 for data transfer. The integrated USB port 144 of the Hand Tool 100 can also be used to transfer data between the Tool 100 and end device (computer).

The exemplary Hand Tool 100 may also incorporate a digital camera (not shown) with infrared or sonic technology capable of measuring tire tread depth using photo analysis and other known technology. The Tool 100 can be wirelessly paired with smart mobile devices, such as the iPhone, Samsung Android, and ZONAR Systems 20/20 tablet via Bluetooth, WiFi, cellular or NFC wireless communications using mobile apps and related programming. Driver reports such as CSA 2010 can be compiled and photo/video data collected and stored for transmission to a remote server, cloud server, corporate office, or the like.

III. Exemplary Operation of the Present Hand Tool

The exemplary Hand Tool 100 may be utilized as: (i) a standalone digital tire pressure gauge, (ii) a wireless RFID (NFC) tag reader/rewriter, and (iii) a wireless data collection and communication device applicable for use combination with the present ITD 10 described above. In one implementation, the Hand Tool 100 functions to statically measure tire pressure readings from 25 psi to 150 psi, and to timestamp and record each reading. The timestamp may be a relative tick count since power. For each setting of the Real Time Clock (RTC), the calendar time and relative tick time is collated and saved to non-volatile flash memory of the Hand Tool 100 to be used in determining the calendar time of all the recorded measurements.

Figure 23:
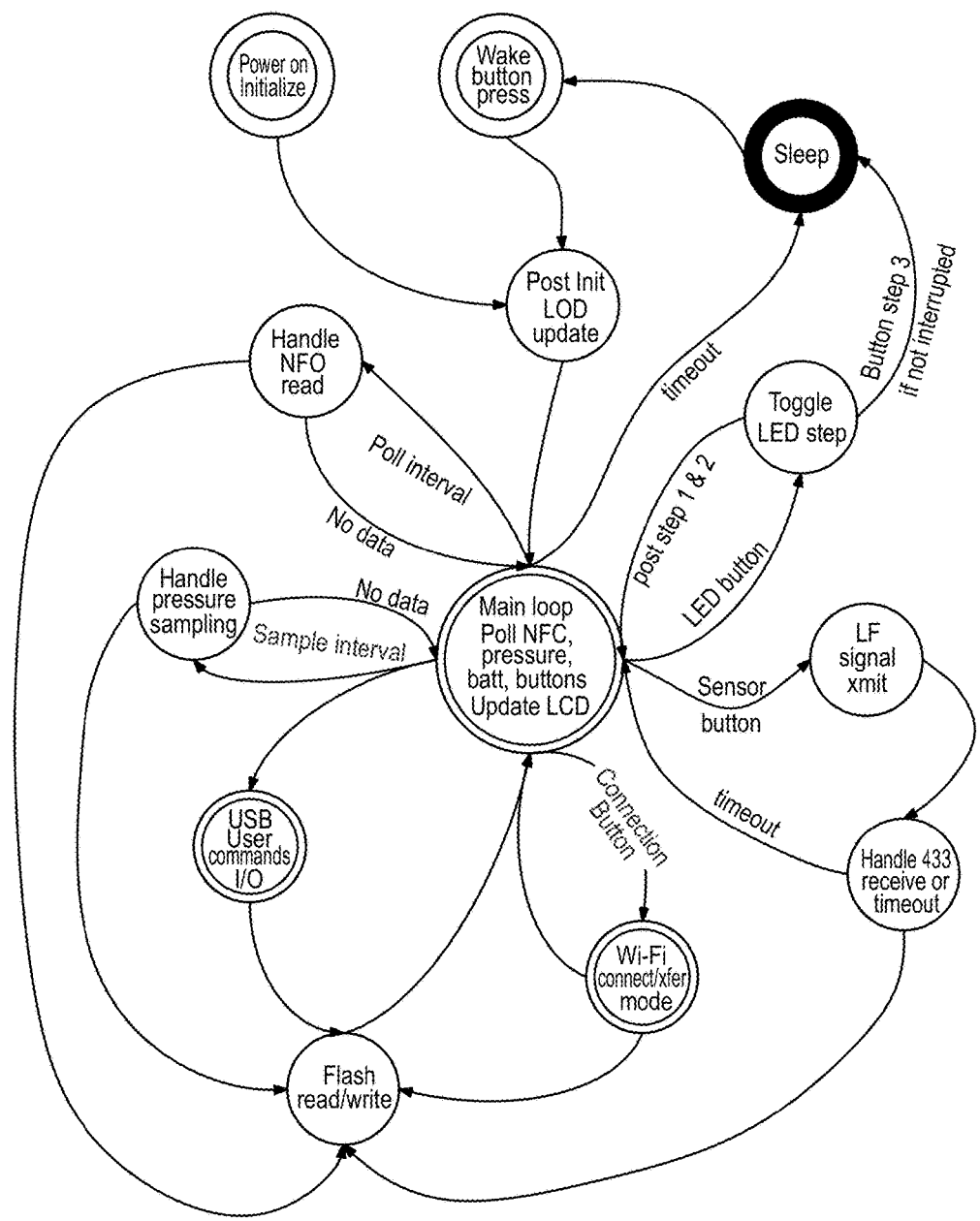
FIG. 23 is a diagram illustrating an exemplary process flow of the present disclosure.

Referring to FIG. 23, in one implementation the Hand Tool 100 is activated by pressing the user control LED button. After initialization, the Hand Tool 100 updates the LCD and enters a main functionality loop. The post initialization display on the LCD shows one or more of the following:

The ambient temperature reading taken by the integrated thermistor
The content of the last record read (e.g., pressure/temperature reading, NFC tag data, or ITD data)
Memory free percentage
Battery level
A unique identifier (e.g, serial ID number or code) for the Hand Tool The initial state of the Hand Tool 100 after power-up initialization is:

Lights off (flashlight LEDs and LCD backlight)
Wi-Fi disabled/sleep
NFC polling interval started (e.g., 500 ms)
Pressure sensor sampling started After entering the main functionality loop, the Hand Tool 100 is ready to perform measurements and take action based on user button presses. When the Hand Tool 100 is in sleep mode and wakes via the user control LED button press, it resumes at the post-initialization step before the main functional loop.

Upon power-up, an initialization message (i.e., welcome screen) is the first screen displayed by the LCD, and quickly changes to the post initialization display. An exemplary post initialization display is represented below.

| Initializing . . . | |
|---|---|
| Mem. | 100% |
| Batt. | 98% |
| Temp: | 75 F. |
| READY TO READ | |
| Records | 0 |
| Mem. | 100% |
| Batt. | 98% |

When a measurement or tag reading is made, the processor-controlled buzzer provides audible feedback indicating positive and negative events. For example, a single short beep may provide affirmative feedback when a measurement has been taken or a data transfer completed. A double short beep may indicate an error or timeout condition. A single long beep may sound when a measurement reading crosses a pre-configured threshold, such as 80 psi or lower pressure value (flat tire condition) or a tire temperature value above a predetermined maximum (e.g., 200 degrees F.). After audible feedback, the Hand Tool LCD will display the record number on the left edge of the line following by the type value, as represented below. Since the NFC tag message may contain an ID string longer than can fit on the screen, the last 8 digits of the ID are shown. The last line of the display is reserved for status and error messages.

| 1: | tag . . . 01234567 |
|---|---|
| 2: | 110 psi |
| 3: | tag . . . 98765432 |
| 4: | 117 psi |

-continued

| M: 99% B: 97% | |
|---|---|
| 4: | 117 psi |
| 5: | ITD . . . 321987654 |
| TEMP 110 Max 150 | |
| Psi 105 Max 137 | |
| M: 97% B: 97% | |

The following examples show LCD tire pressure readings made without identification—i.e., using the Hand Tool 100 as a simple digital tire pressure gauge—and with error messages.

Example 1

| 97: | 112 psi |
|---|---|
| 98: | 99 psi |
| 99: | 98 psi |
| 100: | 80 psi |
| Memory Full | |

Example 2

| 99: | 98 psi |
|---|---|
| 100: | 80 psi |
| **: | 122 psi |
| **: | 120 psi |
| Memory Full | |

Example 3

| 66: | tag . . . 01234112 |
|---|---|
| 67: | 119 psi |
| 68: | tag . . . 01237742 |
| 69: | 128 psi |
| Battery Critical | |

When a memory full condition occurs, a measurement or tag reading is still displayed but the record number is replaced with  to indicate that the data has not been recorded or saved. An audible double-beep the after the measurement or reading also alerts the user to this condition. Similarly, when the battery charge falls below a critical threshold, an audible double-beep alerts the user to the low-battery condition and no further measurements are performed. In this event, the Hand Tool 100** enters a lower power state and maintains the last LCD screen update until the sleep timer expires, after which the LCD is disabled and sleep mode is entered.

If the user control LED button is pressed to exit sleep mode before sufficient battery charging occurs, then the following screen appears:

| Battery Critical |
|---|
| charge before use |

If the battery has been charged past the critical threshold, then sleep exit would resume with the post initialization display and show the current memory and record count.

The LED button step toggle displays the following exemplary screen before entering sleep mode. If any button is pressed or a measurement/reading is made before this timeout, the display resumes with a normal status last line.

Example 4

| | |
|---|---|
| 1: | tag . . . 01234567 |
| 2: | 110 psi |
| 3: | tag . . . 98765432 |
| 4: | 117 psi |
| Sleep in 5 sec . . . | |

In Example 4 above, this screen would display if the user turned-on (or woke) the Hand Tool 100, pressed the LED button again to activate the lighting, then after taking 4 measurements/readings pressed the LED button again to turn off the lighting. If the user wants to continue using the Hand Tool 100 (avoiding sleep mode), then he or she simply presses the LED button again or takes another measurement/reading. If the LED button is pressed during a short sleep-entry timeout, then the display may be updated to normal status line but without activating the LED lights or LCD backlight.

By pressing the user control CONNECT button, the Hand Tool 100 enters a Wi-Fi connect mode. Pressing the CONNECT button once selects and enters adhoc mode. The Hand Tool 100 is then available to accept wireless adhoc connections until the sleep timer expires and the Tool 100 enters sleep mode. The Tool 100 will not enter sleep mode while a connection is active. If the CONNECT button is pressed a second time, the Wi-Fi mode switches from adhoc to infrastructure mode. Initially, the settings for infrastructure mode may be set via USB port if that mode is to be used.

Example 5

| Wi-Fi Adhoc Ready | |
|---|---|
| Records | 97 |
| Mem. | 2% |
| Batt. | 34%. |

As represented in Example 5 above, the first line of the LCD shows the Wi-Fi mode selected. The second line shows the state of the Hand Tool 100—which can be one of the following depending on the mode:

Ready—ready to accept a connection in adhoc mode
Searching—in process of searching for pre-configured SSID
Connected—accepted a connection in adhoc mode, or connected to infrastructure
Not found—infrastructure, pre-configured network not found When measurement records are retrieved and erased from Hand Tool flash memory, the displayed record count will be zero. Since only the a host computing device initiates an erase, a zero record count indicates a successful upload.

Figure 24:
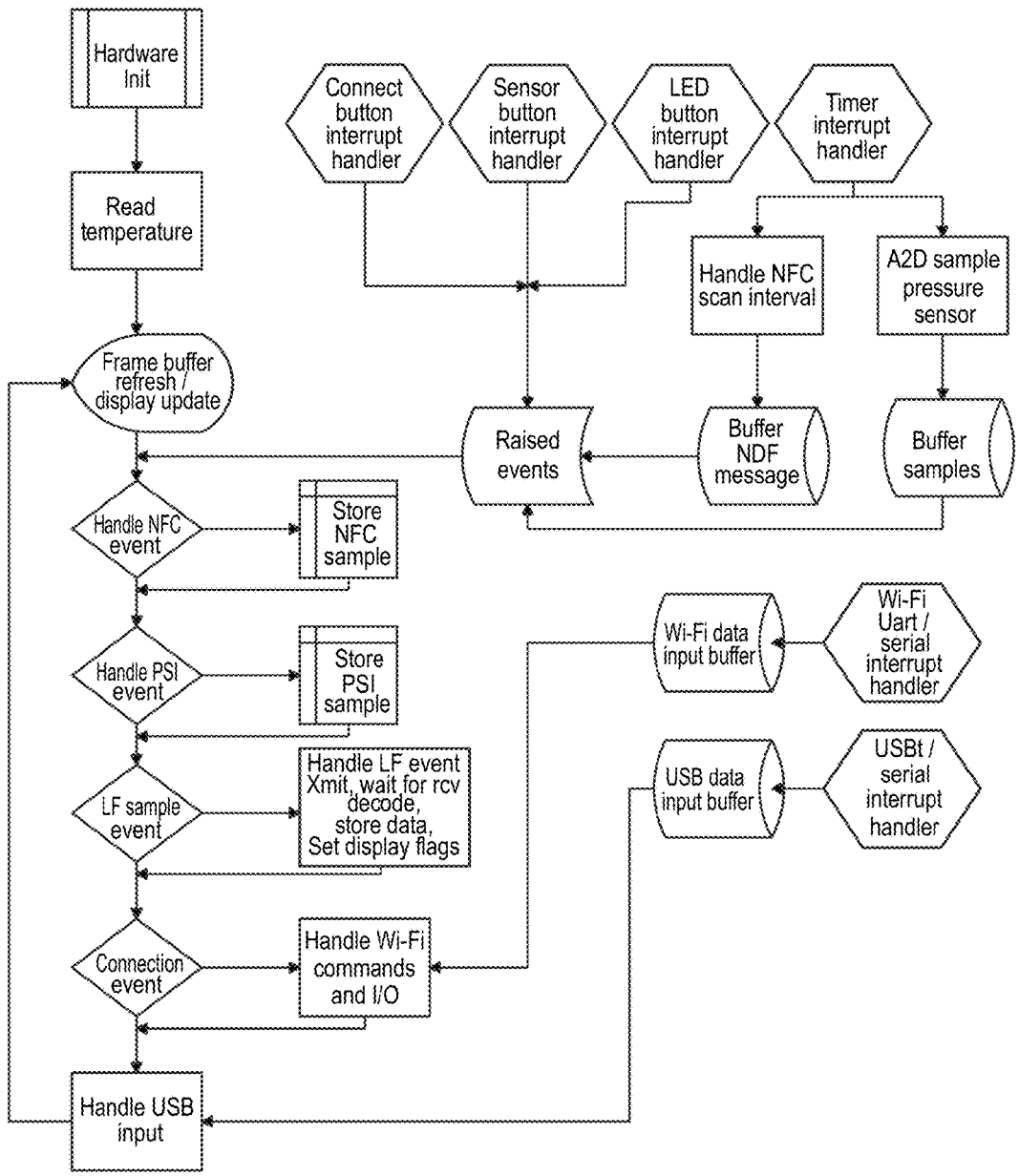
FIG. 24 is a program flow diagram illustrating software architecture of the exemplary Hand Tool.

A simplified program flow diagram illustrating software architecture of the exemplary Hand Tool 100 is represented in FIG. 24. The Hand Tool software may be written as a monolithic, single threaded C program with direct hardware access, and may use microchip libraries where available. Interrupt inputs will raise "events" to be handled within the main code loop. Since blocking operation will rely on a wait function, the wait function may be hooked for pressure sensor sampling and handling NFC tag reads since those operations are "always-on" during idle (main loop) time. In the exemplary embodiment, sensor readings (including NFC and pressure) are repeated only during main loop event handing and not in Wi-Fi mode or when other data exchange (e.g., LF transfer) is being performed.

An Application Mode state variable maintains the current event action to perform while in the main loop. This allows different actions to be taken based on the mode within each iteration of the main loop. It is primarily used to handle the button events and exit from one mode back to the previous mode—for example, the CONNECT button was pressed and the Tool 100 entered into connection event handling. While performing Wi-Fi connection event handing, button event handling from the main loop would trigger the Tool 100 to leave connection event handling.

Referring to the tables below, a flash memory segment of the Tool 100 is allocated for storage of measurement data and tag readings. Records are written from the start of a segment, and continue until there is no more free space for the last record size. Each record saved is prefixed with a record type byte that identifies the type and size of data bytes that follow. Each record type has a predefined structure length. The End-of-List (EOL) byte denotes the end of the last record in the segment. The EOL byte is overwritten by the next incoming record.

| 1 byte | 4 bytes | 64 bytes |
|---|---|---|
| NFC | 32 bit timestamp value | ID + NDF data |

| 1 byte | 4 bytes | 2 bytes |
|---|---|---|
| PSI | 32 bit timestamp value | pressure value |

| 1 byte | 4 bytes | 2 bytes | 2 bytes | 2 bytes | 2 bytes |
|---|---|---|---|---|---|
| IDT | 32 bit timestamp value | temperature value | max temp. value | pressure value | max pressure value |

| 1 byte |
|---|
| EOL |

Figure 25:
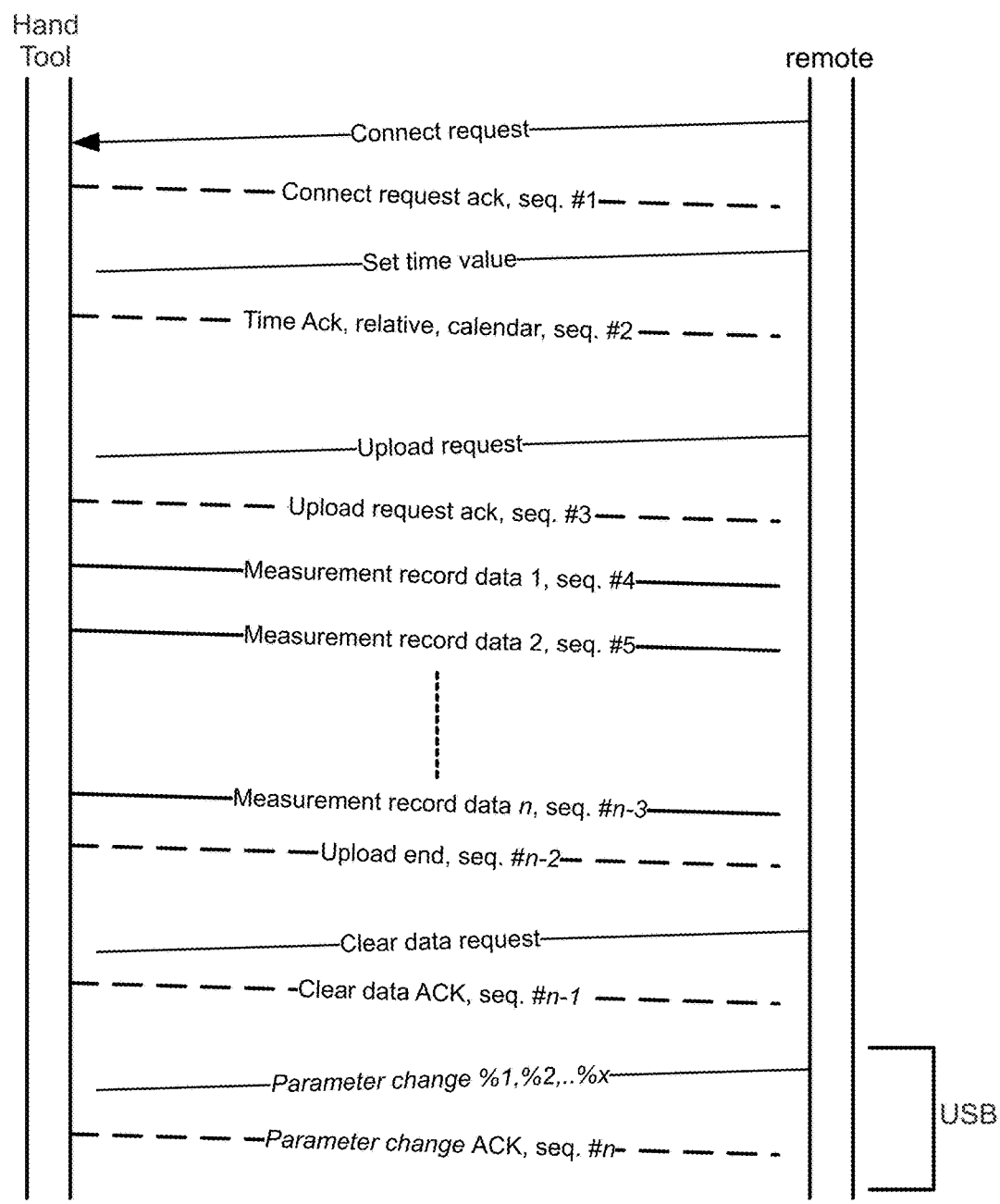
FIG. 25 is a diagram representing the application layer protocol residing on top of both the Wi-Fi layers and USB/serial CDC layer, and defining the application data exchange format that occurs with the far end (remote) connection.

In the exemplary Hand Tool 100, the application layer protocol resides on top of both the Wi-Fi layers and USB/serial CDC layer, and defines the application data exchange format that occurs with the far end (remote) connection. See FIG. 25. Application layer protocol for data transfer and/or configuration can be accessed via either Wi-Fi or USB charging port (as a CDC port). The Hand Tool 100 waits until a wireless connection is established and a request is received. The requests may be pseudo-HTTP-like for ease of the remote side programming and debugging. Incoming requests do not need to come in the same order, and each acknowledge response is accompanied by a sequence number. The initial connection request resets the sequence number back to 1. Wake from sleep mode also resets the sequence. A NACK indicates the request was not processed. The sequence number is still incremented on a NACK just as it would an ACK.

IV. NFC Technology and Exemplary Application

Figure 26:
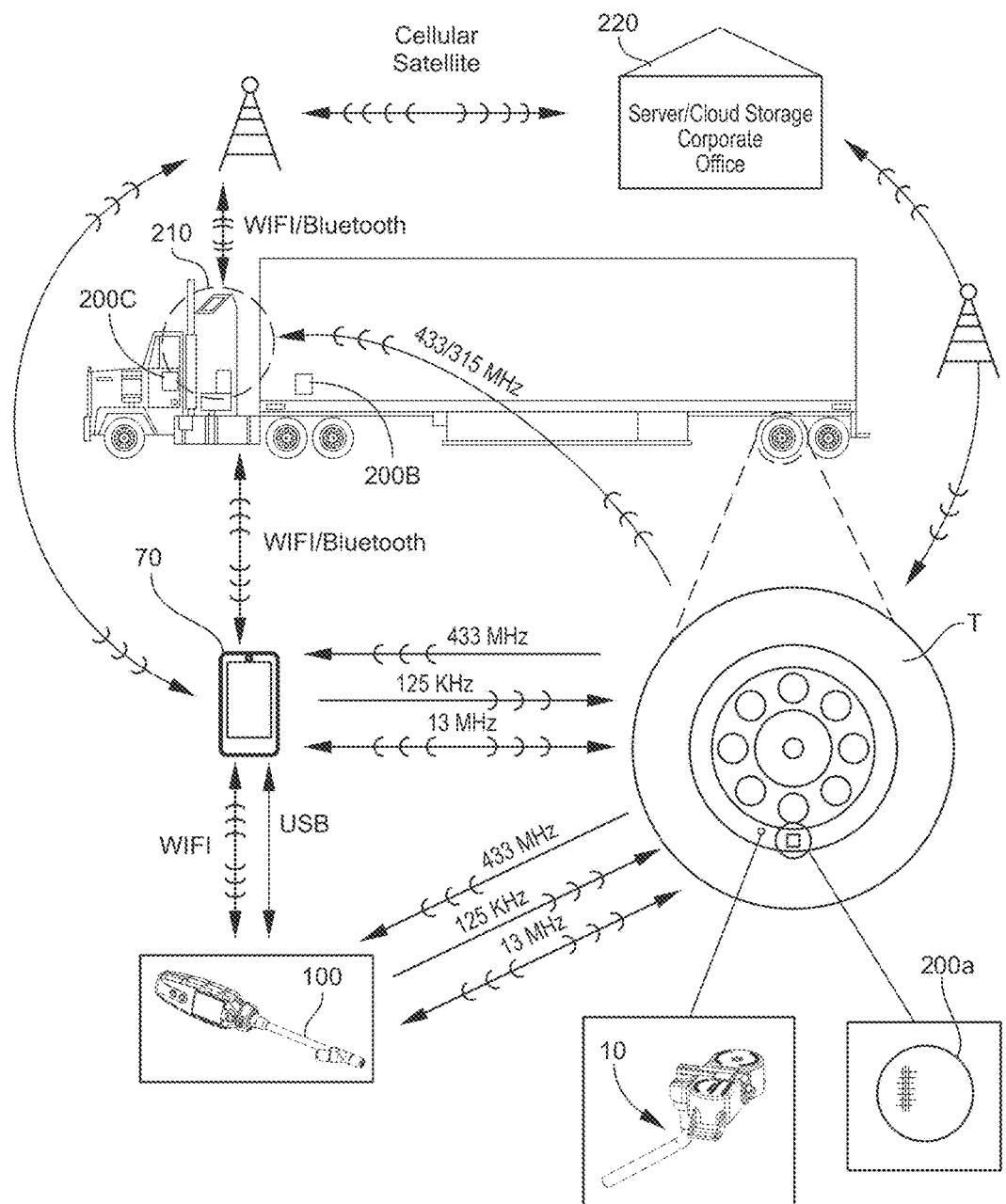
FIG. 26 is a schematic diagram illustrating various implementations of the present system and method utilizing the ITD, Hand Tool, Mobile Device, NFC tags, and other exemplary components.

As mentioned above, various tire, wheel, and user data may be stored in one or more active or passive NFC tags (or stickers) 200A, 200B, 200C [FIG. 26] applied to the tire and/or vehicle and/or driver ID card, and read/written to using either a suitably equipped Mobile Device 70 or the present exemplary Hand Tool 100 or other NFC-enabled devices. The NFC tags allow two-way contactless radio communication between endpoints, and are readily programmable by NFC apps.

As generally known and understood in the art, NFC is a set of short-range wireless technologies, typically requiring a distance of 10 cm or less. NFC operates at 13.56 MHz on ISO/IEC 18000-3 air interface, and at rates ranging from 106 kbit/s to 424 kbit/s. NFC involves an initiator and a target; the initiator actively generates an RF field that can power a passive target. This enables NFC targets to take very simple form factors such as tags, stickers, key fobs, or cards that do not require batteries. NFC peer-to-peer communication is also possible, provided both devices are powered.

NFC tags contain data and are typically read-only, but may be rewriteable. They can be custom-encoded, and may offer between 96 and 4,096 bytes of memory. NFC devices are able to receive and transmit data at the same time. Thus, they can check for potential collisions, if the received signal frequency does not match with the transmitted signal's frequency. NFC and Bluetooth are both short-range communication technologies that may be integrated into the present Hand Tool 100 or Mobile Device 70 (e.g., smartphone, tablet, laptop computer, or the like). With a maximum working distance of less than 20 cm, NFC has a shorter range than Bluetooth, which reduces the likelihood of unwanted interception. That makes NFC particularly suitable for crowded areas where correlating a signal with its transmitting physical device (and by extension, its user) becomes difficult. The connection between two NFC devices is automatically established quickly, generally in less than a tenth of a second. The maximum data transfer rate of NFC may be 424 kbit/s or more. NFC is also compatible with existing passive RFID (13.56 MHz ISO/IEC 18000-3) infrastructures.

In one exemplary implementation of the present system and method, the following data may be written to (rewritten) and read from various NFC tags 200A, 200B, 200C on the vehicle tires, vehicle (tractor and/or trailer), and driver ID card: FLEET DATA including user ID, fleet name, and fleet status; USER DATA including user ID, fleet ID, first and last name, e-mail address, telephone number and other contact information, password, and user status; VEHICLE DATA including vehicle ID, vehicle type (bus, truck, tractor, trailer, dolly), vehicle VIN number, and DOT number; TIRE DATA including tire ID, tire brand/model, tire cost, recommended tire pressure, equal installation, nitrogen, tire location on vehicle, tire installer/inspector name, GPS location, tire pressure, tire temperature, tread depth, tire photographs, VRMS code, maximum temperature reading, minimum pressure reading, time and distance traveled readings while above threshold high temperature value, time and distance traveled readings while below threshold low pressure value; and EVENT DATA including event ID, event date/time, event type (installation, inspection, retread, repair, damage, removal), and miscellaneous comments. The NFC tags may also comprise instructional videos, photographs, computer renderings and other materials useful in implementing the system and method of the present disclosure.

On tires, the exemplary NFC tags may be applied via adhesive or other bonding agent to the side wall of the tire, or embedded in a rubber layer of the tire, or located inside the tire, or at any other point suitably protected against inadvertent damage or removal. A single tire may include multiple NFC tags. The data discussed above can be stored, manipulated, and correlated with tire location on GPS, tire location on truck or trailer, odometer reading, tread depth, and other parameters. In one embodiment, the vehicle tire may include a permanent single dot round label with an indicator dot ("thermo dot") which turns black at a predetermined rated temperature, thereby enabling a permanent record of a maximum tire wall and/or tread temperature. One commercial example of a temperature label is that manufactured by Omega Engineering, Inc. of Stamford, Conn., and sold under the product designation OMEGALABEL® "TL-S series".

Tire data transmitted by the ITD 10 and read by the Hand Tool 100 or Mobile Device 70 may be transferred (written or rewritten) by the Hand Tool 100 or Mobile Device 70 to one or more NFC tags applied to the vehicle, wheel, and/or tire. Data transfer from the Hand Tool 100 and Mobile Device 70 may also be made via "bump file transfer" to other NFC devices or tools. In other implementations, the Hand Tool 100, Mobile Device 70, and/or ITD 10 may wirelessly communicate directly with vehicle electronics (e.g., EOBR) and subsystems via data buses [SAE J1708/ 1587, 1939, 2497 (PLC), 1850 and CAN]. The exemplary Hand Tool 100 and/or ITD 10 may also comprise an integrated cellular modem for wirelessly transferring data directly to a cloud server or other remote terminal.

V. Implementation of Exemplary System and Method

FIG. 26 represents one exemplary implementation of the present system and method in a heavy-duty vehicle utilizing NFC tags 200A, 200B, 200C, the exemplary Hand Tool 100 and ITD 10, and Mobile Device 70, such as previously described. As an initial step, the user may utilize the Hand Tool 100 and/or Mobile Device 70 to read various passive or active NFC tags 200A, 200B, 200C located on the vehicle tire, tractor and/or trailer, and driver ID card. The NFC tags 200A-200C are read at close range using the NFC transceivers (at 13 MHz or 125 KHz, for example) integrated with the Hand Tool 100 and Mobile Device 70. Some or all of the USER DATA, FLEET DATA, VEHICLE DATA, TIRE DATA and EVENT DATA discussed above may be wirelessly transmitted from the NFC tags 200A-200C to the Hand Tool 100 or Mobile Device 70. For example, the NFC tire tag 200A (located near the valve stem) may comprise tire number, tire brand/model, location on vehicle, cost, recommended tire pressure, equal installation, and whether the tire uses nitrogen. The NFC vehicle tag 200B may comprise the vehicle identification number, vehicle type (e.g., bus, truck, tractor, trailer, or dolly), DOT number, and the like. NFC tag 200C may be carried by driver on an ID card, and may comprise fleet identification, driver first and last name, photograph, e-mail address, password, user status, phone number, and the like. The NFC data received by the Hand Tool or Mobile Device is date stamped and stored in non-volatile flash memory. The following discussion references the present Hand Tool 100—it being understood, however, that the same principles apply when utilizing the properly equipped Mobile Device 70 (discussed above) in practicing the concepts of the present disclosure.

After collecting the above data via the NFC tags 200A, 200B, 200C, the exemplary Hand Tool 100 transmits a LF wake-up signal (e.g., at 125 KHz) to the ITD 10 located in a selected tire "T" of the vehicle while parked or idling. Once awakened, the ITD 10 transmits tire data including the ITD's unique identifier, the current ITD battery voltage (% battery life), current tire temperature and air chamber pressure, maximum and minimum pressure values measured since the immediate prior transmission, maximum temperature value measured since the immediate prior transmission, the accumulated time the vehicle tire has traveled while above a threshold high temperature value, the accumulated distance the vehicle tire has traveled while above the threshold high temperature value, the accumulated time the vehicle tire has traveled while below a threshold low pressure value, and/or the accumulated distance the vehicle tire has traveled while below the threshold low pressure value. The ITD data is transmitted wirelessly by the integrated ITD transceiver at 433 MHz (or 315 MHz for passenger vehicles), and received by the Hand Tool 100 via its integrated 433 MHz receiver.

In the present example, all tires "T" of the vehicle contain the present ITD 10 described above. Data for each tire "T" may be read in succession and transmitted to the Hand Tool 100 in an identical manner. All data received by the Hand Tool 100 from the NFC tags 200A, 200B, 200C and ITD 10 is date stamped and stored in flash memory, and may be transferred to the Mobile Device 70 via WiFi, Bluetooth or the like, or by USB cable connection. The Mobile Device 70 may transfer all or part of the collected NFC data and ITD data to the vehicle's telematics 210 (information and communications technology, or ITC), or EOBR, or sealed splice pack system (e.g., VES-PAC™ inline circuit fuse holder), or other vehicle-mounted or integrated computing/communications unit. The collected NFC and ITD data may then be stored and/or transferred by (e.g.) vehicle telematics 210 via satellite or cellular network to a remote terminal 220, such as server, cloud storage, or corporate office. Alternatively, the collected NFC and ITD data may be transmitted by the Mobile Device 70 via satellite or cellular network directly to the remote terminal 220 (e.g., server, cloud storage, or corporate office).

In a further exemplary implementation, the Mobile Device 70 may be used to activate and read the ITD 10, and receive ITD data via an integrated or externally connected (via audio jack) 433 MHz transceiver. The ITD 10 may also transmit at 433/315 MHz directly to the vehicle's telematics 210, or may incorporate a cellular modem (also in the tire) for communicating data directly from the tire "T" to the remote terminal 220. Additionally, the Hand Tool 100 may also incorporate a cellular modem to communicate collected data directly to vehicle telematics 210 and/or the remote terminal 220.

Some or all of the data read by the Hand Tool 100 or Mobile Device 70 may be subsequently written to any one or more of the NFC tire tag 200A, NFC vehicle tag 200B, and NFC driver tag 200C. For example, the Hand Tool 100 may permanently write the "life history" of the tire "T" to the affixed NFC tire tag 200A. This tag information may include, for example, the accumulated time the vehicle tire has traveled while above a threshold high temperature value, the accumulated distance the vehicle tire has traveled while above the threshold high temperature value, the accumulated time the vehicle tire has traveled while below a threshold low pressure value, and/or the accumulated distance the vehicle tire has traveled while below the threshold low pressure value. This tire information may be analyzed by computer software on the Mobile Device 70 or remote terminals. For example, a low pressure tire (below 60 psi) driven for a prolonged time and/or distance should be x-rayed before retreading to assess its structural integrity and relative highway safety if and when retreaded. An electronic database may collect data for each used tire, and software employed to assess the tire condition and alert the tire manufacturer/retreader upon reading the NFC tire tag in the event of a potentially dangerous tire condition (e.g., possible shredding). For vehicle tire inspections using the exemplary Hand Tool 100, an integrated timer may activate at a first data reading (e.g., using the ITD 10) to calculate the total time taken by the driver/inspector to perform tire inspections on all wheels of the vehicle.

VI. Other Exemplary Embodiments

Figure 27:
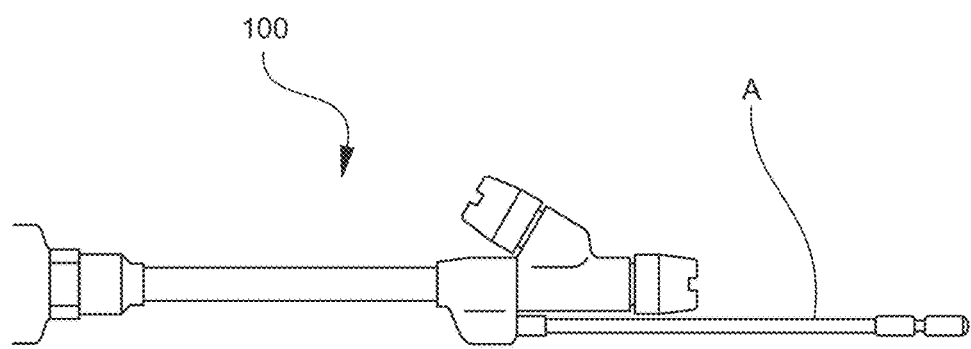
FIG. 27 illustrates a further exemplary embodiment of the present Hand Tool with a removable plug-in extended PCB antenna.

In further exemplary embodiments, the present disclosure comprises a vehicle inspection station with infrared (IR) sensors integrated in the pavement. The sensors take IR readings of the vehicle tires. An elevated tire (tread) temperature is indicated by dark color readings transmitted by the IR sensor. This high temperature condition may evidence misalignment of the tire. In another embodiment, the exemplary Hand Tool or Mobile Device described above may incorporate an IR sensor camera capable of taking IR readings of the vehicle tire. A misaligned or high temperature tire will comprise a dark colored IR reading. Multiple IR sensor cameras may also be fixed to the vehicle chassis for monitoring temperature of all tires 24/7. In yet another exemplary embodiment, one or more TPMS sensors may be embedded in the tread of the vehicle tire and may communicate with multiple IR sensors to measure tire temperature using IR. The IR sensors may be located in the tire tread and side wall. Relative temperature readings may be used to assess realtime alignment and relative safety of the tire. In yet another exemplary embodiment, the present Hand Tool 100 may include a removable plug-in extended PCB antenna "A" shown in FIG. 27.

VII. Exemplary Smart Tag Assembly

Figure 28:
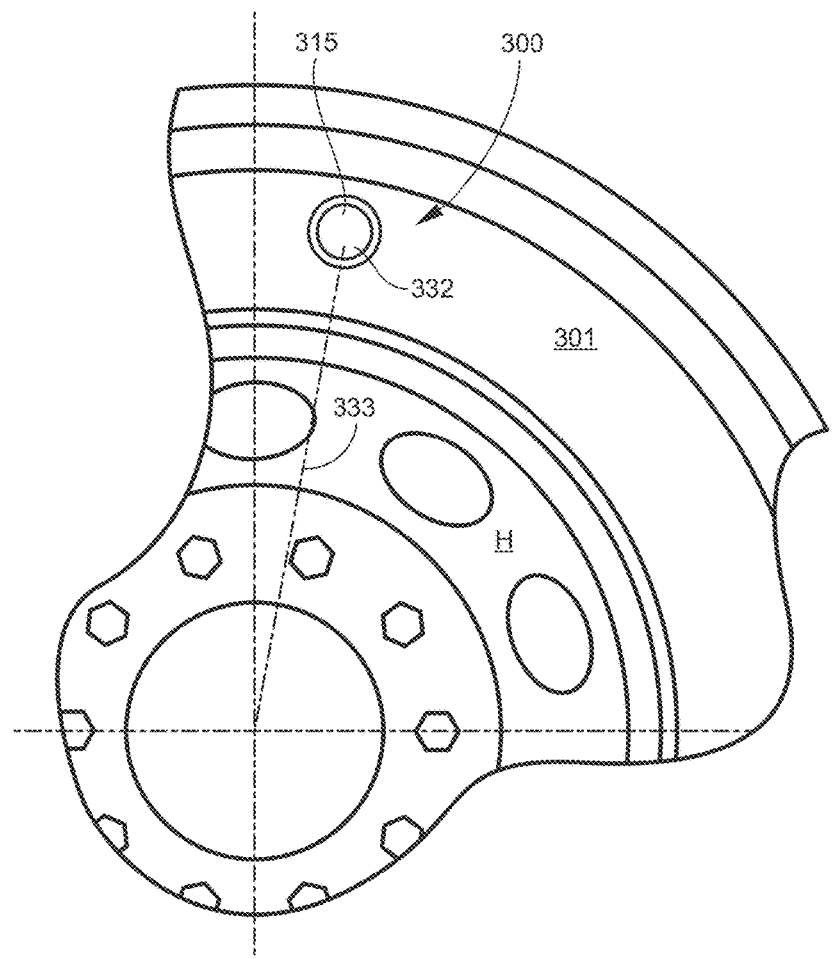
FIG. 28 is a fragmentary view of a vehicle wheel showing the present Smart Tag Assembly (STA) affixed to the vehicle tire.
Figure 29:
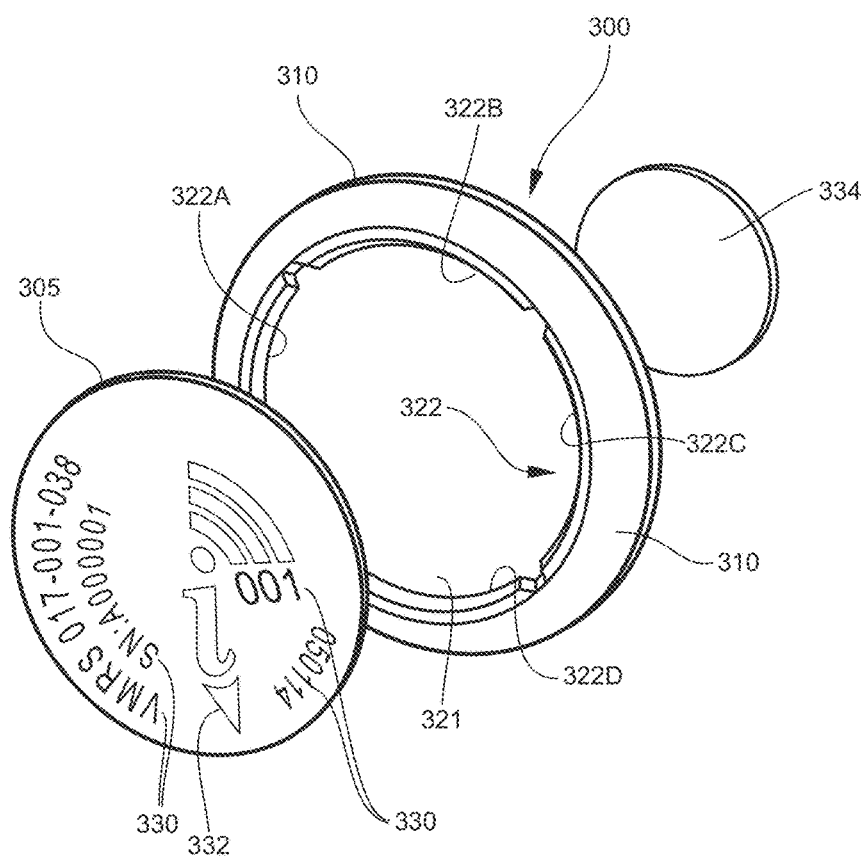
FIG. 29 is an exploded perspective view of the exemplary Smart Tag Assembly.

Referring to FIGS. 28-38, in an exemplary embodiment one or more of the NFC (RFID) tags described above may comprise a Smart Tag Assembly (STA) 300 affixed to an object, such as the vehicle tire 301 shown in FIG. 28, and adapted for electronically storing and processing data, and wirelessly communicating data when interrogated by an RFID reader. The RFID reader may be incorporated in the exemplary Hand Tool 100, as previously described, or may comprise a smartphone, tablet or other NFC-capable electronic device. As shown in FIG. 29, the Smart Tag Assembly 300 comprises a multiple layer RFID laminate 305 and low-profile rubber tag carrier 310. The exemplary RFID laminate 305, shown in FIGS. 29, 30, and 31, incorporates an RFID inlay 311 including a microchip 311A and antenna 311B bonded to a polyethylene terephthalate (PET) substrate 312, and laminated between spacer rings 313, 314, an outside label cover 315 and backing 316. The spacer rings 313, 314 surround the RFID inlay 311 and substrate 312, as best shown in FIG. 31. The RFID laminate 305 may further comprise a pre-applied pressure sensitive adhesive which is exposed by removing a suitable protective release paper (not shown). The above components of the RFID laminate 305 may be assembled using any suitable adhesive or other means. As discussed previously, the exemplary RFID laminate 305 (or tag) may be read-only having a pre-assigned identification numbers, or may be read/write and field programmable.

As best shown in FIGS. 29 and 32-36, the exemplary tag carrier 310 is molded to a Rubber Manufacturing Association (RMA)-2 surface grade for increased adhesion, is substantially disk shaped, and defines a recessed pocket 321 designed for receiving and holding the RFID laminate 305. The tag carrier 310 has an inwardly extending peripheral lip 322 surrounding the recessed pocket 321, and divided into equally spaced arcuate sections 322A-322D adapted for retaining and protecting the RFID laminate 305. The arcuate sections 322A-322D may have respective chamfered top edges 323 to facilitate insertion of the RFID laminate 305 into the carrier 310. To further secure and retain the RFID laminate 305 inside the carrier 310, a plastic or metal snap ring (not shown) may be inserted under the peripheral lip 322 (and over an annular margin of the RFID laminate 305). The outside peripheral edge 325 of the exemplary carrier 310 may also be rounded, as best shown in FIG. 36.

In the present embodiment, the tag carrier 310 is constructed of a generally flexible and durable natural rubber with a hardness of between about 50 and 80 durometer. The height "H" of the exemplary tag carrier 310 is less than 0.25 inches, and its outside diameter "OD" is less than 2.0 inches. The total depth "D1" of the recessed pocket 321 is about 0.10 inches, while the depth "D2" between a bottom of the peripheral lip 322 and an inside surface 326 of the pocket 321 is about 0.040 inches. To facilitate proper and effective adhesion, the inside surface of the pocket 321 and the bottom surface 328 of the carrier 310 may be textured to a depth ranging from about 0.00100 and 0.00600 (e.g., MT 11050).

Referring again to FIGS. 29 and 31, the outside cover 315 of the RFID laminate 305 comprises certain human and/or machine-readable laser printed indicia 330 (e.g., numbers and codes) serving to identify and track the vehicle tire 301, and an orientation marker 332 applicable for indicating proper placement of the Smart Tag Assembly 300 on the tire. The identifying indicia 330 includes, for example, a TMC (Truck Maintenance Council) code, a VMRS (Vehicle Maintenance Service Record) code, a serial number, a model number, and the tire manufacturing date. VMRS is a structured coding system comprising a 9-digit code, represented as follows:

(a) the first three numbers are a System Code (SYS);
(b) the middle three numbers are an Assembly Code (ASY); and
(c) the last three numbers are a Components Code (COM).

For Smart Tag Assembly 300, the 9-digit VMRS codes may be assigned as follows:

| SYS | ASY | COM | Description |
|---|---|---|---|
| 002 | 044 | 015 | Tag - Data Storage, Cab |
| 017 | 001 | 037 | Tag - Data Storage, Tractor/Truck |
| 017 | 001 | 038 | Tag - Data Storage, Trailer |
| 017 | 001 | 039 | Tag - Data Storage, Converter Dolly |
| 018 | 003 | 053 | Tag - Data Storage, Tractor/Truck |
| 018 | 003 | 054 | Tag - Data Storage, Trailer |
| 018 | 003 | 055 | Tag - Data Storage, Converter Dolly |
| 059 | 043 | 002 | Tag - Data Storage, Converter Dolly |
| 071 | 024 | 013 | Tag - Data Storage, Trailer |

All of the above data may be stored locally on a single Smart Tag Assembly 300. In the case of vehicle tires, the manufacturer product code, tire size, fleet tire code, fleet name, Department of Transportation (DOT) code, date of purchase, and other information could be included. The exemplary Smart Tag Assembly 300 can store up to 120 digits of customizable data. Any number of other metrics can also be associated with the uniquely identified item in the cloud. In this way, whenever a Smart Tag Assembly 300 is scanned a complete history of the tracked object could be pulled from the cloud and reviewed. For vehicle tires, this could include a history of repairs and retreads, load range, tread pattern, Vehicle Maintenance Reporting Standards (VMRS) position/condition codes, and more. The following are examples of various STA local and cloud-based data storage:

| Smart Tag Assembly (STA) Local Storage | Cloud Storage |
|---|---|
| STA Serial Number | Load Range |
| Manufacturer Product Code | Tread Depth |
| Tire Size | DOT Date Code |
| Fleet Tire Code | VMRS Position Code |
| Fleet Name | Retread Code |
| Date of Purchase | Retread DOT Number |
| DOT Code | Repair Code |

As best shown in FIG. 28, the orientation marker 332 printed on the assembly cover 315 comprises a direction arrow which is intended to point towards a center of the wheel hub "H" (as indicated by broken line 333) when the Smart Tag Assembly 300 is properly oriented and affixed to the vehicle tire 301. This orientation of the Smart Tag Assembly 300 is intended to reduce fatigue at the connection of the RFID antenna and microchip as the tire side wall flexes during each revolution.

The exemplary Smart Tag Assembly 300 may be mounted to the vehicle tire 301 by first attaching the tag carrier 310 to a prepped and cleaned rubber surface of the tire side wall. The mounting surfaces of the tire 301 and tag carrier 310 may be cleaned using any suitable cleaner, such as isopropanol alcohol. The tag carrier 310 may be permanently affixed to the tire using a epoxy resin or other adhesive 334 (FIG. 29). The resin may be cured in the field using a conventional battery-powered heat gun which incorporates a tubular adapter designed to engage the carrier 310 while properly spacing the heat source from the vehicle tire 301. After removing its release paper, the RFID laminate 305 is quickly inserted into the clean recessed pocket 321 of the tag carrier 310 and shifted or rotated (if necessary) to its proper orientation with the marker arrow 332 pointing to the center of the wheel hub "H". The RFID laminate 305 is held inside the carrier 310 by the adhesive, as well as mechanically by the inward extending peripheral lip 322.

Figure 37:
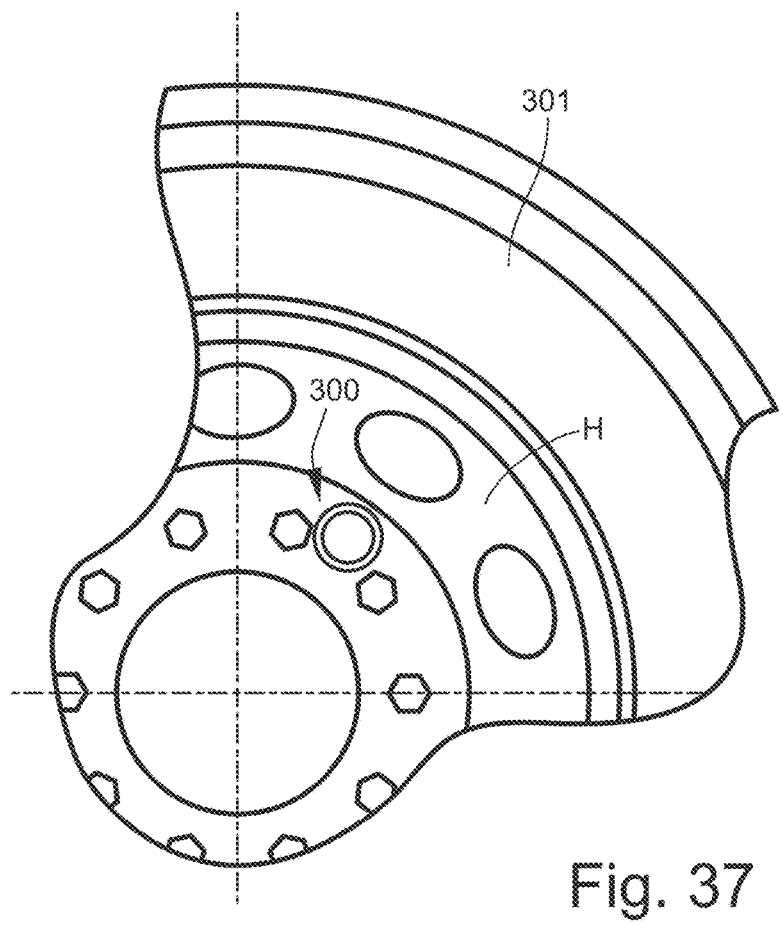
FIG. 37 is a fragmentary view of a vehicle wheel showing the present Smart Tag Assembly (STA) affixed to the metal wheel hub.
Figure 38:
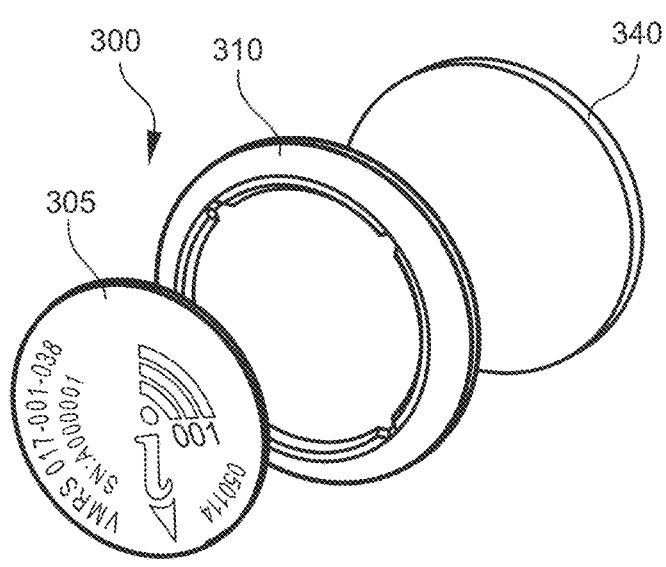
FIG. 38 is an exploded perspective view of the exemplary Smart Tag Assembly, and showing the double-sided adhesive spacer designed to reside between the STA and the metal surface of the hub.

Referring to FIGS. 37 and 38, when mounting the Smart Tag Assembly 300 to a metal part, such as a vehicle wheel hub "H", a double-sided adhesive spacer disk 340 may be incorporated between the metal surface of the hub and the tag carrier 310 and RFID laminate 305. The spacer disk 340 may help overcome some of the problems RFID tags suffer when near metal, such as detuning and reflecting of the RFID signal, which can cause poor tag read range, phantom reads, or no read signal at all. Alternatively, the Smart Tag Assembly 300 may incorporate an RFID-on-metal (abbreviated to ROM) tag. The RFID-on-metal tag may comprise a specialized antenna design that utilizes the metal interference and signal reflection for longer read range than similar sized tags attached to non-metal objects.

VIII. Alternative Exemplary Smart Tag Assembly

Figure 39:
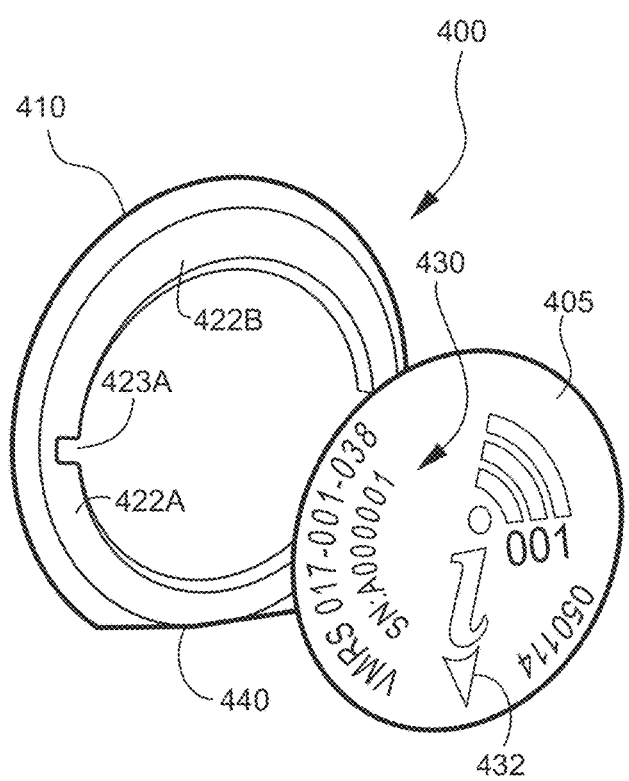
FIG. 39 is an exploded perspective view of a Smart Tag Assembly according to another exemplary embodiment of the present disclosure.

FIGS. 39-46 illustrate components of a further exemplary embodiment of the Smart Tag Assembly 400 designed for mounting on a vehicle tire 401 (FIG. 40) adjacent its rubber side wall 402. As previously described, the exemplary Smart Tag Assembly 400 is adapted for electronically storing and processing data, and wirelessly communicating data when interrogated by an RFID reader. The RFID reader may be incorporated in the exemplary Hand Tool 100, as previously described, or may comprise a smartphone, tablet or other NFC-capable electronic device. As shown in FIG. 39, the Smart Tag Assembly 400 comprises a multiple layer RFID laminate 405 and low-profile rubber tag carrier 410. The exemplary RFID laminate 405 may be constructed in a manner identical to that shown in FIGS. 29, 30, and 31—incorporating an RFID inlay including a microchip and antenna bonded to a polyethylene terephthalate (PET) substrate, and laminated between spacer rings, an outside label cover, and backing. The exemplary RFID laminate 405 may function identically to the RFID laminate 305 described above.

As best shown in FIGS. 41-44, the exemplary tag carrier 410 is molded to a Rubber Manufacturing Association (RMA)-2 surface grade for increased adhesion, is substantially disk shaped, and defines a recessed pocket 421 designed for receiving and holding the RFID laminate 405. The tag carrier 410 has an inwardly extending peripheral lip 422 surrounding the recessed pocket 421, and divided by notches 423A, 423B into equal arcuate (e.g., semi-circular) sections 422A, 422B adapted for retaining and protecting the RFID laminate 405. The arcuate sections 422A, 422B may have respective chamfered top edges 424 (FIG. 45) to facilitate insertion of the RFID laminate 405 into the carrier 410. To further secure and retain the RFID laminate 405 inside the carrier 410, a plastic or metal snap ring (not shown) may be inserted under the peripheral lip 422 (and over an annular margin of the RFID laminate 405). The outside peripheral edge 425 of the exemplary carrier 410 may also be rounded, as best shown in FIG. 45.

Like tag carrier 310 previously described, the exemplary tag carrier 410 may be constructed of a generally flexible and durable natural rubber with a hardness of between about 50 and 80 durometer, or between about 50 and 60 durometer. The dimensions of the exemplary tag carrier 410 may be substantially identical to the dimensions of carrier 310. For example, the height of the exemplary tag carrier 410 may be less than 0.25 inches, and its outside diameter may be less than 2.0 inches. The total depth of the recessed pocket 421 may be about 0.10 inches, while the depth between a bottom of the peripheral lip 422 and an inside surface 426 of the pocket 421 may be about 0.040 inches. To facilitate proper and effective adhesion, the inside surface 426 of the pocket 421 and outside back surface 428 of the carrier 410 may be textured to a depth ranging from about 0.00100 and 0.00600 (e.g., MT 11050).

Referring again to FIG. 39, the outside cover of the RFID laminate 405 comprises certain human and/or machine-readable laser printed indicia 430, such as indicia 330 previously described, serving to identify and track the vehicle tire 401, and an orientation marker 432 applicable for indicating proper placement of the Smart Tag Assembly 400 on the tire. As previously described, the identifying indicia 430 includes, for example, a TMC (Truck Maintenance Council) code, a VMRS (Vehicle Maintenance Service Record) code, a serial number, a model number, and the tire manufacturing date. VMRS is a structured coding system comprising a 9-digit code, represented and assigned as described above with reference to Smart Tag Assembly 300.

All of the above data may be stored locally on a single Smart Tag Assembly 400. In the case of vehicle tires, the manufacturer product code, tire size, fleet tire code, fleet name, Department of Transportation (DOT) code, date of purchase, and other information could be included. The exemplary Smart Tag Assembly 400 can store up to 120 digits of customizable data. Any number of other metrics can also be associated with the uniquely identified item in the cloud. In this way, whenever a Smart Tag Assembly 400 is scanned a complete history of the tracked object could be pulled from the cloud and reviewed. For vehicle tires, this could include a history of repairs and retreads, load range, tread pattern, Vehicle Maintenance Reporting Standards (VMRS) position/condition codes, and more.

As previously described, the orientation marker 432 printed on the RFID laminate 405 comprises a direction arrow which is intended to point towards a center of the wheel hub when the Smart Tag Assembly 400 is properly oriented and affixed to the vehicle tire 401. This orientation of the Smart Tag Assembly 400 is intended to reduce fatigue at the connection of the RFID antenna and microchip as the tire side wall flexes during each revolution, as previously described.

Like Smart Tag Assembly 300, the exemplary Smart Tag Assembly 400 may be mounted to the vehicle tire 401 by first attaching the tag carrier 410 to a prepped and cleaned rubber surface of the tire side wall. The mounting surfaces of the tire 401 and tag carrier 410 may be cleaned using any suitable cleaner, such as isopropanol alcohol. The tag carrier 410 may be permanently affixed to the tire using a epoxy resin or other adhesive. The resin may be cured in the field using a conventional battery-powered heat gun which incorporates a tubular adapter designed to engage the carrier 410 while properly spacing the heat source from the vehicle tire 401. Alternative heat sources may comprise heat lamps or heat pads that take advantage of convective, conductive and radiative heating. In other exemplary embodiments, the tag carrier 410 may be mounted to the rubber tire 410 by chemical or heat based vulcanization processes, through ultrasonic welding, using Pressure Sensitive Adhesives (PSAs), or any combination of such mounting means. If using a light-cured adhesive, the tag carrier 410 may be constructed of a substantially light-penetrable material sufficient to enable effective curing without directly exposing the bonding agent (applied to the outside or back surface of carrier 410) to the curing light.

After removing its release paper, the RFID laminate 405 is quickly inserted into the clean recessed pocket 421 of the tag carrier 410 and shifted or rotated (if necessary) to its proper orientation with the marker arrow 432 pointing to the center of the wheel hub. The RFID laminate 405 is held inside the carrier 410 by the adhesive, as well as mechanically by the inward extending peripheral lip 422.

Figure 40:
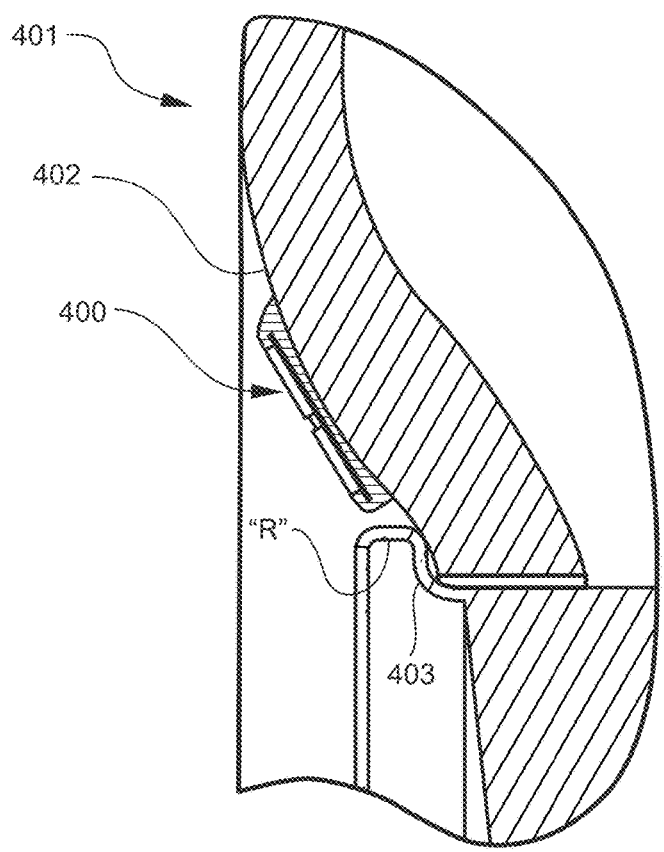
FIG. 40 is an environmental view showing the exemplary Smart Tag Assembly mounted to the curved rubber sidewall of a vehicle tire.
Figure 41:
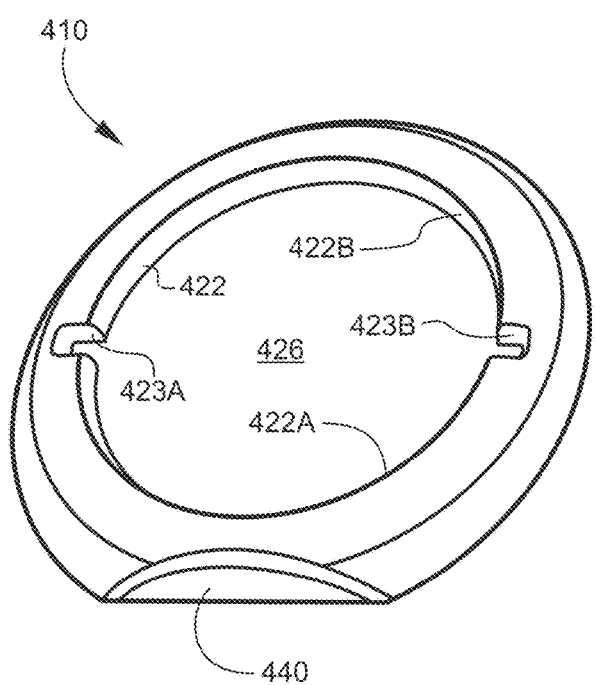
FIG. 41 is a perspective view of a concave-backed tag carrier incorporated in the exemplary Smart Tag Assembly.
Figure 42:
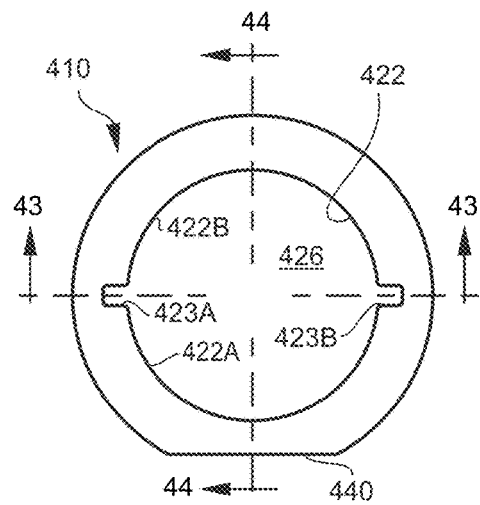
FIG. 42 is a plan view of the exemplary tag carrier.
Figure 43:
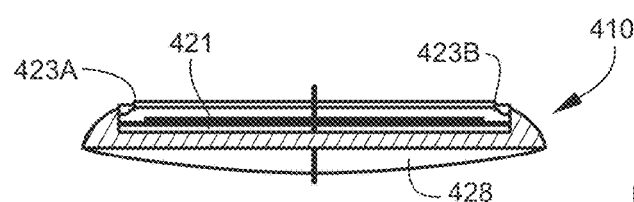
FIG. 43 is a cross-sectional view of the exemplary tag carrier taken substantially along line 43 of FIG. 42.
Figure 44:
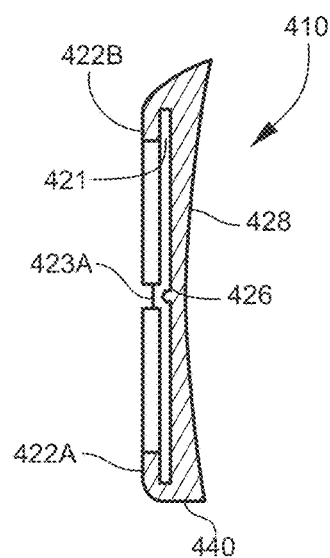
FIG. 44 is a cross-sectional view of the exemplary tag carrier taken substantially along line 44 of FIG. 42
Figure 45:
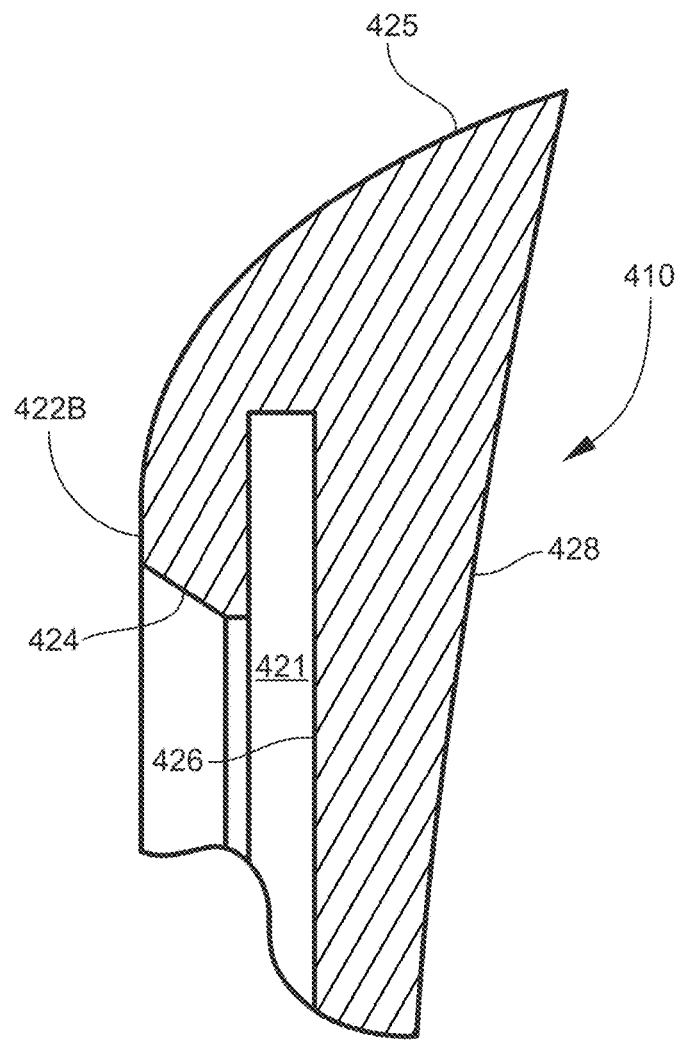
FIG. 45 is an enlarged fragmentary cross-sectional view of the exemplary tag carrier.

As best shown in FIGS. 40, 43, and 44, to promote increased mounting strength and permanency, the outside back surface 428 of the exemplary tag carrier 410 may have a substantially concave curvature. This concave surface 428 is designed to substantially match a complementary convex curvature "C" of the tire sidewall 402 (FIG. 40), and thereby reduce any inherent outward flexing during installation. This preformed curvature of the present embodiment may help mitigate the effect of forces seeking to return an otherwise "flat" resilient carrier to its natural state. In some cases, such forces may cause the flat carrier to lift away from the tire sidewall 402 during the curing process. To facilitate proper orientation, the exemplary tag carrier 410 may also define a generally flat peripheral region 440 (best shown in FIG. 42) intended to reside closely adjacent the wheel rim "R" in a relatively protected area of the tire sidewall 402 proximate the tire bead 403. In this orientation, the two circumferentially-spaced notches 423A, 423B in the carrier lip 422 point tangentially away from the nearest point on the wheel rim "R", thereby promoting increased bending or flex to closely fit the carrier 410 to the curvature of the tire 401.

Figure 46:
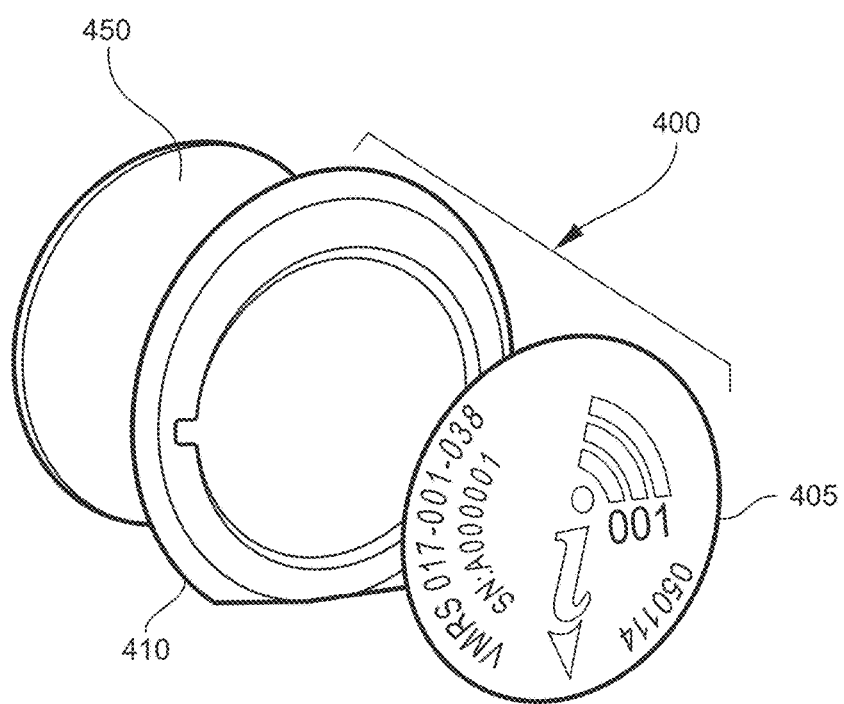
FIG. 46 is an exploded perspective view of the exemplary Smart Tag Assembly (STA), and showing a double-sided adhesive spacer designed to reside between the STA and a metal surface of the hub.

Referring to FIG. 46, when mounting the Smart Tag Assembly 400 to a metal part, such as vehicle wheel rim "R" (shown in FIG. 40) or hub, a double-sided adhesive spacer disk 450 may be incorporated between the metal surface of the rim or hub and the tag carrier 410 and RFID laminate 405. As previously discussed, the spacer disk 450 may help overcome some of the problems RFID tags suffer when near metal, such as detuning and reflecting of the RFID signal, which can cause poor tag read range, phantom reads, or no read signal at all. In order for the tag and read to communicate successfully, there must be a gap in between the tag's antenna and the metal surface. The rubber carrier can be used to establish this gap when in close proximity to metals. The necessary distance required to overcome the interference in our testing setup was 0.145 inches. At this distance or greater, the NFC tags could function normally even when in close proximity to steel cast iron, aluminum, etc. Alternatively, the Smart Tag Assembly 400 may incorporate an RFID-on-metal (abbreviated to ROM) tag. The RFID-on-metal tag may comprise a specialized antenna design that utilizes the metal interference and signal reflection for longer read range than similar sized tags attached to non-metal objects.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed:

1. A method for communicating data between a vehicle, a handheld tire data collection and communication tool, and a user identification device, comprising:
    locating at least one nearfield communication (NFC)-enabled device on the vehicle, the NFC-enabled device comprising an NFC tag affixed to a tire of the vehicle;
    wirelessly communicating vehicle user data between at least two of the NFC-enabled device, the handheld tire data collection and communication tool, and the user identification device, the vehicle user data being selected from a group consisting of user ID, fleet ID, name, electronic mail address, telephone number, password, and user status;
    when the vehicle user data matches stored vehicle user data on at least two of the NFC-enabled device, the handheld tire data collection and communication tool, and the user identification device, enabling operation the handheld tire data collection and communication tool; and
    locating the handheld tire data collection and communication tool in sufficiently close proximity to the NFC-enabled device on the vehicle to wirelessly collect and communicate data to and from the NFC-enabled device.

2. The method according to claim 1, and comprising transferring the vehicle user data between the NFC-enabled device and a mobile computing device using a telematics system of the vehicle.

3. The method according to claim 2, and comprising date-stamping the vehicle user data upon transfer between the NFC-enabled device and the mobile computing device.

4. The method according to claim 3, wherein the mobile computing device comprises a mobile telephone.

5. The method according to claim 1, and comprising transferring the vehicle user data between the NFC-enabled device and a mobile computing device via bump file transfer.

6. The method according to claim 1, and comprising wirelessly transferring vehicle identification data between the NFC-enabled device and a mobile computing device, the vehicle identification data being selected from a group consisting of vehicle ID, vehicle type, vehicle VIN number, and DOT number.

7. The method according to claim 1, and comprising wirelessly transferring vehicle fleet data between the NFC-enabled device and a mobile computing device, the vehicle fleet data being selected from a group consisting of fleet name and fleet status.

8. The method according to claim 1, and comprising wirelessly transferring vehicle tire data between the NFC-enabled device and a mobile computing device, the vehicle tire data being selected from a group consisting of tire ID, tire brand, tire model, recommended tire pressure, tire location on vehicle, name of tire installer, name of tire inspector, tire temperature, tread depth, tire photographs, VRMS code, maximum temperature reading, minimum pressure reading, time and distance traveled readings while above a threshold high temperature value, time and distance traveled readings while below a threshold low pressure value.

9. The method according to claim 1, and comprising wirelessly transferring vehicle event data between the NFC-enabled device and a mobile computing device, the vehicle event data being selected from a group consisting of event ID, event date, event time, and event type.

10. The method according to claim 1, and comprising wirelessly transferring instructional data between the NFC-enabled device and a mobile computing device, the instructional data comprising instructional videos, photographs, and computer renderings.

* * * * *